United States Patent [19]

Han et al.

[11] Patent Number: 5,254,633

[45] Date of Patent: Oct. 19, 1993

[54] PROCESS FOR THE PREPARATION OF CONDUCTIVE POLYMER BLENDS

[75] Inventors: Chien-Chung Han, Madison; Ronald L. Elsenbaumer, Morris Township, Morris County, both of N.J.

[73] Assignee: Allied Signal Inc., Morris Township, Morris County, N.J.

[21] Appl. No.: 727,768

[22] Filed: Jul. 10, 1991

[51] Int. Cl.$^5$ ............................................. C08L 75/04
[52] U.S. Cl. .............................. 525/327.4; 525/327.6; 525/328.1; 525/328.2; 525/328.3; 525/328.4; 525/328.5; 525/328.6; 525/328.7; 427/121; 427/212; 427/213.3; 427/213.32; 427/213.33; 427/213.34; 427/213.36; 427/222
[58] Field of Search ..................... 427/121, 212, 213.3, 427/213.31, 213.32, 213.33, 213.34, 213.36, 222; 525/327.4, 327.6, 328.1, 328.2, 328.3, 328.4, 328.5, 328.6, 328.7, 328.8, 329.1, 329.2, 329.3, 329.4, 329.5, 371

[56] References Cited

U.S. PATENT DOCUMENTS

| | | | |
|---|---|---|---|
| 4,582,872 | 4/1986 | Hudgin et al. | 524/439 |
| 4,615,829 | 10/1986 | Tamura et al. | 252/500 |
| 4,798,685 | 1/1989 | Yaniger | 528/76 |
| 4,806,271 | 2/1989 | Yaniger | 528/76 |
| 4,822,638 | 4/1989 | Yaniger | 528/76 |
| 4,851,487 | 7/1989 | Yaniger et al. | 528/76 |
| 4,855,361 | 8/1989 | Yaniger et al. | 524/439 |

FOREIGN PATENT DOCUMENTS

| | | |
|---|---|---|
| 035713 | 2/1981 | European Pat. Off. |
| 152632 | 12/1984 | European Pat. Off. |
| 0259813 | 9/1987 | European Pat. Off. |
| 3440617 | 11/1984 | Fed. Rep. of Germany |
| 62-47109 | 1/1987 | Japan |
| 62-12073 | 5/1987 | Japan |
| WO8901694 | 7/1985 | PCT Int'l Appl. |
| WO9010297 | 5/1986 | PCT Int'l Appl. |
| US88/02319 | 5/1988 | PCT Int'l Appl. |

OTHER PUBLICATIONS

B. Wessling et al., "Post Polymerisation Processing of Conductive Polymers (CP)", *Synthetic Metals*, vol. 18, pp. 671–676, (1987).

K. Miyasaka et al., "Electrical Conductivity of carbon–polymer Composites as a Function of Carbon Content", Journal of Materials *Science*, vol. 17, pp. 1610–1616, (1982).

B. Wessling et al., "Post-Polymerization Processing of Conductive Polymers: A Way of Converting Conductive Polymers to Conductive Materials", Synthetic Metals, vol. 15, pp. 183–193, (1986).

B. Wessling et al., "Thermoplastic Conversion of 'Doped' Polyaniline from the Amorphous to a Partially Crystalline State".

Synthetic Metals, vol. 16, p. 127–131 (1986).

B. Wessling et al, "Elektrisch".

T. Masatake et al; "Secondary batteries with polyaniline cathods"; Aug. 8, 1988.

Chemical Abstracts, vol. 109, No. 6, & Jpn. Kokai Tokkyo Koho JP 63 55,861(88 55,861) Mar. 10, 1988.

Chan et al., Thermal Analysis of Conducting Polymers Part I, Journal of Therm. Analysis, 35, 765–774 (1989).

S. Li et al. "Soluble Polyaniline" Synthetic Metals, 20, 1987 141–149.

K. Hyodo et al. "Short Communication . . . High Ion Selective Electro-chemical . . . " Electro Acia vol. 33, No. 1, pp. 165–166, 1983.

L. T. Yu et al. "Conductive et Constitution Chimique de Sera Conducteurs Macromoleculaires" Revue Generale de L'Elec, vol. 75, No. 9, pp. 1014–1019.

M. Jozefowicz et al. "Relations entre Proprietes Chimiques et . . . " Revue Generale de L'Electricite vol. 75, No. 9, pp. 1008–1013.

D. Muller et al. "Preparation, Proprietes Chimiques et (List continued on next page.)

*Primary Examiner*—Maurice J. Welsh
*Attorney, Agent, or Firm*—Richard C. Stewart, Jr.

[57] ABSTRACT

This invention relates to a process for forming polyaniline films or coatings on a substrate and to composite articles formed by said process.

34 Claims, No Drawings

OTHER PUBLICATIONS

Conduct . . . " pp. 4087–4091.

L. T. Yu et al. "Etude experimentale de la Conductivite en Couran Continu des Composes Macromoleculaires" No. 16/pp. 2931–2932 Jrnl Polymer Sc. Pt C.

M. Jozefowicz et al. "Proprietes Nouvelles des Polymeres Semi . . . " J. Poly. Sci. Part C/No. 22, pp. 1187–1195 (1969).

T. Kobayashi et al. "Electrochemical Reactions Concerned with Electrochromism . . . " J. Electroanal Chem. 177/(1984) pp. 281–291.

T. Kobayashi et al. "Oxidative Degradation Pathway of Polyaniline Film Electrodes" J. Electroanal Chem. 177(1984) pp. 293–297.

F. Cristofini et al. "Proprietes Electrochimiques des Sulfates de Polyaniline" C. R. Acad. Sc. Paris, t. 268 (14 Apr. 1969) pp. 1346–1349.

D. Labarre et al. "Polymeres Conducteurs Organiques Filmogenes a base de Polyaniline" C. R. Acad. Sc. Paris, t. 269 (29 Oct. 1969) pp. 964–969 Series C.

R. de Surville, "Electrochemical Chains Using Protolytic Organic Semiconductors" Elec. Acta 1958 vol. 13, pp. 1451–1458.

R. de Surville, "Produits D oxidation Pousée des Anines Aromariques" Ann. Chim. t2, 1967 pp. 149–157.

PROCESS FOR THE PREPARATION OF CONDUCTIVE POLYMER BLENDS

BACKGROUND OF THE INVENTION

1. Field of the Invention

This invention relates to polymer blends comprising one or more electrically conductive conjugated backbone polymers and one or more non-conductive polymers, and to processes for the preparation of such blends. Another aspect of this invention relates to articles of manufacture fabricated totally or in part from the blend of this invention.

2. Prior Art

There are many techniques known in the art for forming polymer blends comprising electrically conductive fillers to give electrically conductive compositions. Typical conductive fillers used in the art are conductive carbons, graphites, metal fibers, metal flakes and metal powders. Various arts exist for compounding these materials into thermoplastics and thermosetting resins to give the desired combination of mechanical and electrical properties. (See A. Sternfield, Modern Plastics International, No. 7, 48 (1982).)

Because of the macroscopic nature of these electrically conductive fillers, the onset for three-dimensional conductivity in blends comprised of them typically occurs at some threshold loading, referred to as the percolation point. It is at this threshold loading level of the conductive filler that the conductive particles touch one another continuously throughout the blend in all three dimensions. One important aspect in the art is to devise conductive fillers and processing techniques to provide blends that exhibit desired electrical conductvities at minimum loading levels. Typically for conductive carbons with high surface areas ($>5m^2/g$), onsets for conductivity occur at loadings above 15 vol % carbon. With higher surface area carbons, onsets occur at 10-11 vol %, and with very high surface area carbons, onsets can occur at loadings as low as 5-7 vol %. (see B. Wessling, Kunstoffe, 76, 930 (1986)).

Another important aspect in the art is to modify the shape of the conductive fillers to provide fillers with anisotropic shapes. Such shaped fillers allow the use of lower loading to effect conductivity onsets in the blends compared to symmetrically shaped particles. For example, the use of small metal fibers with high aspect ratios may give certain blends that inhibit onsets for electrical conductivity at loadings as low as 2-4 vol. %. Systems comprising such anisotropically shaped fillers are typically difficult to process and often lead to non-reproducible results. (See K. Miyasaka, et al. J. Mat. Sci 17, 1610-1616 (1982).)

Inherently electrically conductive conjugated polymers are known in the art to be blendable with conventional thermoplastic and thermoset polymers. But, as with other conventional conductive fillers, blends containing inherently conductive polymers exhibit onsets for conductivity at loadings of about 7 vol % or above. See B. Wessling & H. Volk, Synthetic Metals, 15 183 (1986)) 16 127 (1986); 18, 671 (1987), and DE 3,440,617.

One technique recently developed for fabricating, conductive metal/polymer blends that contain exceptionally low metal loadings, entails melting a metal-polymer blend together until the metal is in a fibrous form. Such blends are described as having improved impart resistance and electrical and thermal conductivity. (D. E. Hudgin and M. A. SenSarzadih, U.S. Pat. No. 4,582,872).

SUMMARY OF THE INVENTION

One aspect of this invention relates to a process for forming an electrically conductive blend of one or more electrically conductive "conjugated backbone polymers" and one or more non-conductive homopolymers or copolymers which comprises processing a plurality of particles comprising a non-conductive polymer coated totally or in part with one or more conjugated backbone homopolymers or copolymers into a blend comprising said conjugated backbone homopolymer or copolymer dispersed in a continuous phase comprising said non-conductive homopolymer or copolymer. As used herein a "conjugated backbone homopolymers or copolymers" are polymers which are comprised of alternating carbon-carbon double bonds (either singularly or as part of an aromatic ring structure), which may optionally incorporate heteroatoms such as oxygen, nitrogen, sulfur, selenium, phosphorous and the like along the polymer backbone. and can be rendered to an electrically conductive state (equal to or greater than $10^{-9}$ ohm$^{-1}$cm$^{-1}$ as determined by the four-in-line probe method described in "Laboratory Notes on Electrical and Galvanometric Measurements" by H. H. Wieder, Elsevier Scientific Publishing Co. New York, N.Y., 1979) by doping with some dopants known in the art; and a "non-conductive homopolymer or copolymer" is a polymer which cannot be doped to an electrically conductive state.

Another aspect of this invention relates to the electrically conductive or non-conductive blends formed by the process of this invention, and to electrically conductive or non-conductive articles fabricated from such blends.

This invention provides several advantages over the prior art. For example, this invention requires a small amount of conducting polymer to render the blends with useful conductivity. In some preferred embodiments of the invention, the conducting polymer blends prepared from this invention require as little as about 0.1 wt % of the conducting polymer to reach the percolation states (i.e. to build up the continuous three dimensional conducting networks in the blending matrix); while the blends prepared by prior art methods by blending the conducting polymer particles with conventional nonconducting polymer usually require 7 to 50 wt % of conducting polymer.

Since smaller amounts of conducting polymer are required for blends prepared by the process of this invention to have electrical conductivities useful for antistatic and electrostatic dissipation (i.e. ESD) applications, the degree of coloring of the said blends is less than with blends prepared from prior art methods. This invention is particularly useful for the manufacture of transparent volumetric antistatic/ESD films, fibers or parts.

DESCRIPTION OF THE PREFERRED EMBODIMENTS

In the process of this invention, a plurality of polymer particles each comprising a core formed of one or more non-conductive homopolymers or copolymers totally or partially coated with a coating of one or more electrically conductive or non-conductive conjugated backbone are processed into an electrically conductive comprising said conjugated backbone homopolymer or copolymer dispersed in continuous phase blend comprising said non-conductive homopolymer or copolymer or article formed totally or in part from said blend. Any processing techniques known in the art can be used for processing the composition of this invention into a desired forms of articles, such as fibers, films, parts, foams, and the like. For example, gel spinning and solution-spinning can be used for making conductive fibers from the composition of this invention. For another example, blow-forming can be used for making conductive films from the said composition. Various molding techniques are also useful for making conductive films and parts from said composition. The molding method employed may vary widely and often will depend on the nature of the homopolymer or copolymers. For example, in those embodiments of the invention where the conjugated conductive backbone polymer is heat sensitive, or when those can be carried out at relatively low temperatures, cold molding procedures can be employed. Moreover, in those embodiments of the invention in which the electrically conductive conjugated backbone honopolymer or copolymer is relatively stable, cold and hot molding techniques may be employed. The method known to those of skill in the art can be used. For example, techniques used in conventional processes for molding homopolymer or copolymer particles into blends and parts may be used. Illustrative of such techniques are compression molding, injection molding, transfer molding, cold molding, blow molding, sluch or rotational molding, extrusion, calendaring, sintering and the like. Such useful techniques are well known to those skilled in the art. For example, useful techniques are described in more detail in all of which are hereby incorporated by reference. Other useful techniques for forming the blend or articles of this invention include agglomeration techniques such as compaction, extrusion, agitation, fusion and the like. Such agglomeration techniques are descried in more detail in "Modern Plastic Encyclopedia '91", McGraw Hill, 1990. In the preferred embodiments of the invention, the plurality of polymer particles are fabricated into a blend or a part, using polymer molding techniques.

The particles used in the practice of this invention comprises a non-conductive honopolymer or copolymer totally or partially coated with a conjugated backbone honopolymer or copolymer, which may be electrically conductive or electrically non-conductive.

The coated particles for use in the process of this invention may be formed by various methods suitable for coating a polymer particle with another polymer. All such conventional procedures for forming polymer coated substrates can be used. Illustrative of such useful coatings procedures are solution coating procedures. For example, a solvent of neutral or electrically conductive conjugated backbone homopolymer or copolymer, such as polyaniline, can be dissolved in a suitable solvent, such as pyrrolidine. The polymer particles are then contacted with the solution. Thereafter, the particles are removed from contact with the solution leaving a residue of the solution on all or a part of the surface of the particles. The solvent is evaporated to form the coated polymer. These procedures are described in more detail in co-pending U.S. patent application Ser. No. 630,923 filed Dec. 20, 1990, Ser. No. 630,905 filed Dec. 20, 1990, Ser. No. 689,420 filed Apr. 22, 1991, Ser. No. 070,464 filed Jul. 7, 1987 and U.S. Pat. Nos. 5,006,278, 4,983,332 and 4,711,742.

Another suitable method for coating all or a portion of the surface of the particle include polymerization of the conjugated backbone polymer on the surface of the particle. For example, all or a portion of the non-conductive polymer particle can be coated with an initiator for initiating the oxidative polymerization of the monomer of the conjugated backbone polymer, which initiator is preferably capable of being adsorbing, absorbing, or adsorbing and absorbing on the surface of the particle. The initiator has an oxidation potential lower than that of the monomer and when oxidized is capable of coupling with monomer thereby initiating the oxidative polymerization of the monomer to form the conjugated backbone polymer on all or a portion of the surface of the particle. The initiator coated particle is then contacted with the monomer in the presence of an oxidizing agent capable of oxidizing the coated initiator, preferably in the presence of a dopant for the conjugated backbone polymer, to form conjugated backbone polymer on all or a portion of the surface of the particle. This process is described in more detail in U.S. Pat. No. 5,225,495 "Conductive Polymer Film Formation Using Initiator Pretreatment" filed concurrently herewith.

The weight ratio of conjugated backbone homopolymer or copolymer to non-conductive homopolymer or copolymer may vary widely depending on the application of the blend. For example in those embodiments of the invention where lower electrical conductivity are required as for example electrical conductivity for antistatic and electrostatic dissipation application ($10^{-12}$ to $10^{-11}$ $Ohm^{-1}cm^{-1}$) smaller amounts of conjugated backbone homopolymer or copolymer are used, and for applications where higher electrical conductivity is required as for example EMI shielding ($>10^{-1}$ $ohm^{-1}cm^{-1}$) larger amounts are used, However, in each of these applications, a given electrical conductivity by incorporating a smaller amount of conjugated backbone honopolymer or copolymer in the blend as compared to conventional procedures where coated particles are not used. The non-conductive polymer is usually present in the major amount, i.e. greater than about 50 wt % based on the total weight of the particle. Preferably, as small amount as possible of the conjugated backbone homopolymer or copolymer is employed i.e. less than about 7% by wgt to provide a blend on dopin with a suitable dopant having an electrical conductivity of at least about $10^{-12} ohm^{-1}cm^{-1}$. In the preferred embodiments of the invention, the amount of non-conductive polymer is from greater than about 50 wgt % to less than 100 wgt %, and the amount of conjugated backbone homopolymer or copolymer is from about 50 % by wgt. to greater than 0 wgt %; in the more preferred embodiments of the invention, the amount of non-conductive polymer is from about 65 wgt % to less than 100 wgt %, and the amount of conjugated backbone homopolymer or copolymer is from about 35 wgt % to more than 0 wgt %; and in the most preferred embodiments of the invention, the amount of non-conductive homopolymer or copolymer is from about 80 wgt % to about 100 wgt %, and the amount of conjugated backbone homopolymer or copolymer is from about 20 wgt % to greater than about 0 wgt %. In the embodiment of choice, the amount of conjugated backbone honopolymer or copolymer is less than about 6 % by wgt, preferably less than about 6 % by wgt, more preferably less than about 5 % by wgt and particle form a bland having an electrical conductivity of at least about $10^{-12}$ ohm$^{-1}$cm$^{-1}$. All wgt % are percent on the total weight of the polymer.

The conjugated backbone homopolymer or copolymer is in the form of a coating on all or a portion of the surface of a non-electrically conductive polymer. The thickness of the coating may vary widely. The average thickness of the coating is from about 0.001 to about 1000 μm. In the preferred embodiments of the invention, the average thickness of the coating is from about 0.01 to about 100 μm and in the more preferred embodiments of the invention, the average thickness of the coating is from about 0.1 μm to about 50 μm. In the most preferred embodiments of the invention, the average thickness of the coating is from about 0.1 to about 10 μm.

The particle size is not critical and may vary widely. Any size of polymer particle can be used as long as they are convenient for processing. For example, particles may br relatively large as for example 1 cm$^3$ in volume or greater. Particles may also be relatively small for example $10^{-18}$ cm$^3$ in volume or smaller. Usually the average particle volume is from about $10^{-18}$ cm$^3$ to about 1 cm$^3$. Preferred particle volumes are from about $10^{-15}$ cm$^3$ to about $10^{-1}$ cm$^3$, more preferred particle volumes are from about $10^{-12}$ cm$^3$ to about $10^{-2}$ cm$^3$ and most preferred particle volumes are from about $10^{-9}$ cm$^3$ to about $10^{-3}$ cm$^3$.

The type of non-conductive homopolymer or copolymer employed may vary widely and any type can be used. Illustrative of useful polymers are thermoplastic and thermosetting polymers. Thermoset polymers for use in the practice of this invention may vary widely. Illustrative of such useful thermoset polymers are alkyds derived from the esterification of a polybasic acid such as phthalic acid and a polyhydric alcohol such as glycol; allylics such as those produced by polymerization of dialkyl phthalate, dialkyl isophthalate, dialkyl maleate, and dialkyl chlorendate; amino resins such as those produced by addition reaction between formaldehyde and such compounds as melamine, urea, aniline, ethylene urea, sulfonamide and dicyandiamide; epoxies such as epoxy phenol novolak resins, diglycidyl ethers of bisphenol A and cycloaliphatic epoxies; phenolics such as resins derived from reaction of substituted and unsubstituted phenols such as cresol and phenol with an aldehyde such as formaldehyde and acetaldehyde; polyesters; silicones; and urethanes formed by reaction of a polyisocyanate such as 2,6-tolylene diisocyanate, 2,4-tolylene diisocyanate, 4,4-diphenylmethane diisocyanate, 1,6-hexamethylene diisocyanate and 4,4'-dicyclohexylmethane diisocyanate with a polyol such as polyether polyol (trimethylol propane, 1,2,6-hexanetriol, 2-methyl glycoside, pentaerythitol, poly(1,4-tetramethylene ether) glycol, sorbitol and sucrose), polyester polyols such as those prepared by esterification of adipic acid, phthalic acid and like carboxylic acids with an excess of difunctional alcohols such as ethylene glycol, diethylene glycol, propanediols and butanediols.

Thermoplastic polymers for use in the practice of this invention may vary widely. Illustrative of such thermoplastic polymers are polyesters such as poly(glycolic acid), poly(ethylene succinate), poly(ethylene adipate), poly(tetramethylene adipate), poly(ethylene azelate), poly(ethylene sebacate), poly(decamethylene adipate), poly(decamethylene sebacate), poly(1,2-dimethylpropiolactone), poly(pivaloyl lactone), poly(para-hydroxybenzoate), poly(ethylene oxybenzoate), poly(ethylene isophthalate), poly(ethylene terephthalate), poly(decamethylene terephthalate), poly(hexamethylene terephthalate), poly(1,4-cyclohexane dimethylene terephthalate), poly(ethylene-1,5-naphthalate), poly(ethylene-2,6-naphathalate), poly(1,4-cyclohexylidene dimethylene-teraphthalate) and the like; polyamides such as poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), poly(hexamethylene adipamide) (nylon 6,6), poly(heptamethylene pimelamide) (nylon 7,7), poly(octamethylene suberamide) (nylon 8,8), poly(hexamethylene sebacamide), (nylon 6,10), poly(nonamethylene azelamide) (nylon 9,9), poly(decamethylene azelamide) (nylon 10,9), poly(decamethylene sebacamide) (nylon 10,10), poly[bis-(4-aminocyclohexyl)methane-1,10-decanedicarboxamide] (Quiana)(trans), poly(m-xylene adipamide), poly(p-xylene sebacamide), poly(2,2,2-trimethylhexamethylene terephthalamide), poly(piperazine sebacamide), poly(metaphenylene isophthalamide) (Nomex), poly(p-phenylene terephthalamide) (Kevlar), and the like; polycarbonates such as poly[methane bis-(4-phenyl)carbonate], poly[1,1-ethane bis-(4-phenyl)carbonate], poly[2,2-propane bis-(4-phenyl)carbonate), poly[1,1-butane bis-(4-phenyl) carbonate), poly[1,1-(2-methyl propane)bis(4-phenyl) carbonate], poly[2,2-butane bis-(4-phenyl)carbonate], poly[2,2-pentane bis-(4-phenyl)carbonate], poly[4,4-heptane bis-(4-phenyl)carbonate], poly [1,1-(1-phenyl- ethane)bis(4-phenyl)carbonate], poly(diphenylmethane bis-(4-phenyl)carbonate), poly[1,1-cyclopentane bis-(4-phenyl)carbonate), poly[1,1-cyclohexane bis-(4-phenyl) carbonate], poly(thio bis-(4-phenyl)carbonate], poly [2,2-propane bis-(4-(2-methyl phenyl)]carbonate], poly [2,2-propane bis-[4-(2-chlorophenyl)]carbonate], poly[2,2-propane bis-[4-(2,6-dichlorophenyl)]carbonate), Poly[2,2-propane bis-[4-(2,6-dibromophenyl))carbonate], poly[1,1-cyclohexane bis-[4-(2,6-dichlorophenyl) carbonate], and the like; polymers derived from the polymerization of α,β-unsaturated monomers such as polyethylene, acrylonitrile/butadiene/styrene terpolymer, polypropylene, poly(1-butene), poly(3-methyl-1-butene), poly(1-pentene), poly(4-methyl-1-pentene), poly(1-hexene), poly(5-methyl-1-hexene), poly(1-octadecene), polyisobutylene, poly(isoprene), 1,2-poly(1,3-butadiene) (isotatic), 1,2-poly(1,3-butadiene) (syndiotatic), polystyrene, poly(α-methylstyrene), poly(2-methylstyrene), poly(4-methylstyrene), poly(4-methoxystyrene), poly(4-phenylstyrene), poly(3-phenyl-1-propene), poly(2-chlorostyrene), poly(4-chlorostyrene), poly(vinyl fluoride), poly(vinyl chloride), poly(vinyl bromide), poly(vinylidene fluoride), poly(vinylidene chloride), poly(tetrafluoroethylene) (Teflon), poly(chlorotrifluoroethylene), poly(vinylcyclopentane), poly(vinylcyclohexane), poly(α-vinylnaphthalene), poly(vinyl alcohol), poly(vinyl methyl ether), poly(vinyl ethyl ether), poly(vinyl propyl ether), poly(vinyl isopropyl ether), poly(vinyl butyl ether), poly(vinyl isobutyl ether), poly(vinyl sec-butyl ether), poly(vinyl tert-butyl ether), poly(vinyl hexyl ether), poly(vinyl octyl ether), poly(vinyl methyl ketone), poly(methyl isopropenylketone), poly(vinyl formate), poly(vinyl acetate), poly(vinyl propionate), poly(vinyl chloroacetate), poly (vinyltrifluoroacetate), poly(vinyl benzoate), poly(2-vinylpyridine), poly(vinylpyrrolidinone), poly(vinyl-carbazole), poly(acrylic acid), poly(methyl acrylate), poly- (ethyl acrylate), poly(propyl acrylate), poly(iso-propyl acrylate), poly(butyl acrylate), poly(isobutyl acrylate), poly(sec-butyl acrylate), poly(tert-butyl acrylate), poly(methacrylic acid), poly(methyl methacrylate), poly(ethyl methacrylate), poly(propyl methacrylate), poly(isopropyl methacrylate), poly(butyl methacrylate), poly(isobutyl methacrylate), poly(sec-butyl methacrylate), poly(tert-butyl methacrylate), poly(2-ethylbutyl methacrylate), poly(hexyl methacrylate), poly(octyl methacrylate), poly(dodecyl methacrylate), poly(octadecyl methacrylate), poly(phenyl methacrylate), poly(benzyl methacrylate), poly(cyclohexyl methacrylate), poly(methyl chloroacrylate), polyacrylonitrile, polymethacrylonitrile, polyacrylamide, poly(N-isopropylacrylamide), and the like; polydienes such as poly(1,3-butadiene) (cis), poly(1,3-butadiene) (trans), poly(1,3-butadiene)(mixt.), poly(1,3-pentadiene) (trans), poly(2-methyl-1,3-butadiene) (cis), poly(2-methyl-1,3-butadiene) (trans), poly(2-methyl-1,3-butadiene)(mixt.), poly(2-tert-butyl-1,3-butadiene) (cis), poly(2-chloro-1,3-butadiene)(trans), poly(2-chloro-1,3-butadiene) (mixt.) and the like; polyoxides such as poly(methylene oxide), poly(ethylene oxide), poly(tetra-methylene oxide) poly(ethylene formal), poly(tetra-methylene formal), polyacetaldehyde, poly(propylene oxide), poly(hexene oxide), poly(octene oxide), poly(trans-2-butene oxide), poly(styrene oxide), poly(3-methoxypropylene oxide), poly(3-butoxypropylene oxide), poly(3-hexoxypropylene oxide), poly(3-phenoxy-propylene oxide), poly(3-chloropropylene oxide), poly [2,2-bis(chloromethyl)-trimethylene-3-oxide] (penton), poly(2,6-dimethyl-1,4-phenylene oxide) (PPO), poly(2,6-diphenyl-1,4-phenylene oxide) (Texax, P30), and the like; polysulphides such as poly(propylene sulphide), poly (phenylene sulphide) and the like; polysulfones such as poly[4,4'-isopropylidene diphenoxy di(4-phenylene) sulphone); noryl, and mixtures thereof. The non-conductive polymer component of the particle may be a thermoset polymer or a thermoplastic polymer.

In the preferred embodiments of the invention, the non-conductive homopolymer or copolymer is a thermoplastic homopolymer or copolymer. Preferred thermoplastic polymers are nylon, polyester, poly(carbonate), poly(α-olefin), acylics, methacylics, substituted and unsubstituted polybutadienes, poly(vinyl halide), polysulfones, polyvinyl ether, polyvinyl ester, poly(vinyl aryl), poly(ethylene oxide), poly(vinyl alcohol), poly(vinyl acetate), and acrylonitrile/butadiene/styrene, terpolymer.

More preferred thermoplastic homopolymer or copolymers are nylons, polycarbonate, polyesters, poly(α-olefin), chlorinated poly(α-olefin), substituted and unsubstituted poly(butadienes), poly(vinyl halide), polysulfones, poly(vinyl ether), poly(vinyl acetate) poly(vinyl alcohol), poly(ethylene oxide) acrylonitrile/butadiene/styrene terpolymer, polystyrene, and most preferred thermoplastic polymers are poly(ethylene terephthalate), nylon-6, nylon-6,6, nylon-12, polycarbonate, poly(vinylchloride, poly(chlorotrifluoro ethylene), polyethylene terephthalate glycol, polyethylene, polypropylene, chlorinated polyethylene or polypropylene, polyisobutylene, polybutadiene, polystyrene, polyethylene oxide, acrylonitrile/butadiene/ styrene terpolymer (ABS).

The particles are coated with an electrically conductive conjugated backbone homopolymer or copolymers. Illustrative of such polymers are poly(unsaturated) polymers such as substituted and unsubstituted polyacetylene; substitited or unsubstituted poly(heteroaromatics), such as polythiophenes, poly(thienylene) polypyrroles, polyquinolines, polyisothianaphthenes, polycarbazoles, poly(alkyl thiophenes) and the like; substitited or unsubstituted poly(aromatics) such as polyphenylene sulfide, polyaniline, polyphenylene, polynaphthalene, and polyperinaphthalene, poly(azulene); and substituted or unsubstituted poly(aromatic vinylenes) such as poly(phenylene vinylene), poly(dimethoxy phenylene vinylene), poly(naphthalene vinylene) and the like; and substituted or unsubstituted poly(heteroaromatic vinylenes) such as poly(thienylene vinylene), poly(furylene vinylene), poly(carbazole vinylene), poly(pyrrole vinylene) and the like.

Preferred conjugated backbone homopolymer or copolymers are substituted or unsubstituted polyanilines, poly(heterocycles), and aromatic or heteroaromatic vinylenes. Illustrative of preferred homopolymers or copolymers poly(heterocycles), and aromatic or heteroaromatic vinylenes are those comprising moieties of the formulas I to XIV:

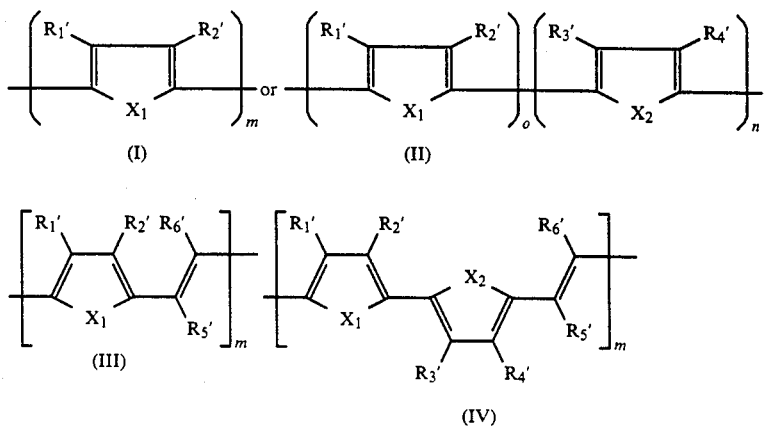

-continued
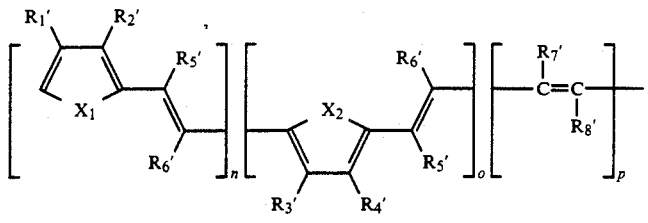
(V)
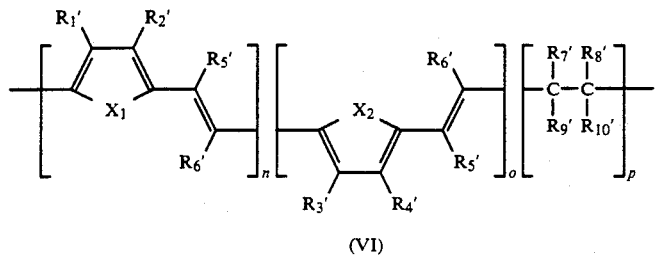
(VI)
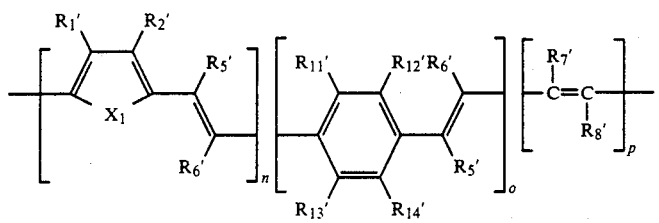
(VII)
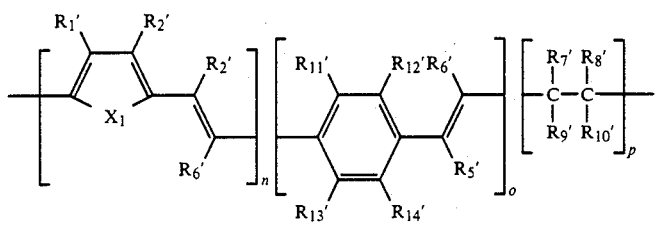
(VIII)
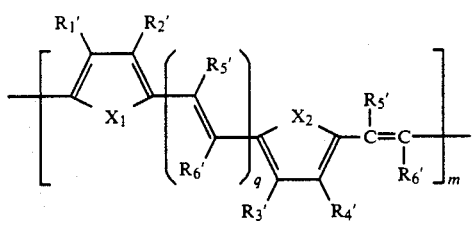
(IX)
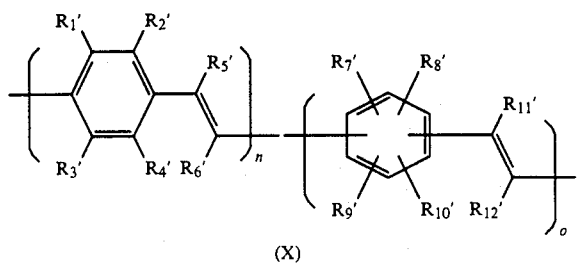
(X)

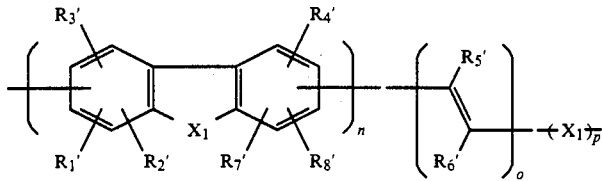

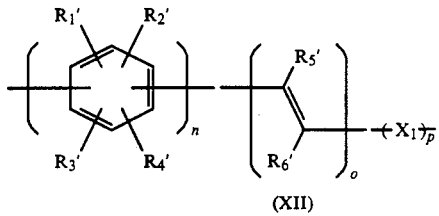

(XII)

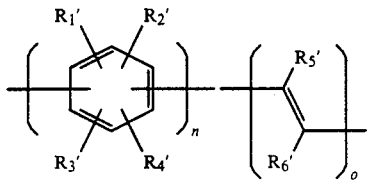

(XIII)

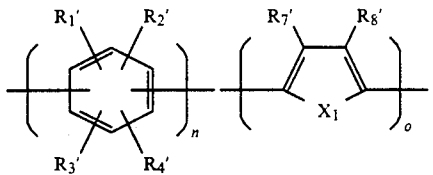

(XIV)

wherein:

m, and the sum of n, o and p are the same or different and are integers at least about 20, with the proviso that at least one of n or o is greater than zero;

q is an integer which can range from 0 to about 4;

$R'_1$, $R'_2$, $R'_3$, $R'_4$, $R'_5$, $R'_6$, $R'_7$, $R'_8$, $R'_9$, $R'_{10}$, $R'_{11}$, $R'_{12}$, $R'_{13}$ and $R'_{14}$ are the same or different at each occurrence and are hydrogen or isotopes thereof, hydroxyl, alkyl, alkenyl, aryl, alkoxy, cycloalkyl, cycloalkenyl, alkanoyl, alkylthio, aryloxy, alkylthioalkyl, alkynyl, alkylaryl, arylalkyl, amido, alkylsulfinyl, alkoxyalkyl, alkylsulfonyl, aryl, arylazino, diarylamino, alkylamino, dialkylamino, alkylarylamino, arylthio, heteroaryl, arylsulfinyl, alkoxycarbonyl, arylsulfonyl, acid functional groups, such as sulfonic acid, carboxylic acid, phosphonic acid, phosphoric acid, phosphinic acid, sulfinic acid and the derivatives thereof, such as salts, esters, and the like; halogen, nitro, cyano, or alkyl or phenyl substituted with one or more of acid functional groups, such as sulfonic acid, carboxylic acid, phosphonic acid, phosphoric acid, phosphinic acid, sulfinic acid and the derivatives thereof, such as salts, esters, and the like; halo, amino, nitro, hydroxyl, cyano or epoxy moieties, or derivatives of a moiety of the formula:

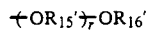

wherein:

$R'_{15}$ is a divalent alkylene moiety having from 1 to about 7 carbon atoms;

$R'_{16}$ is alkyl having from 1 to about 20 carbon atoms; and r is a natural number from 1 to about 50; or $R'_1$ and $R'_2$, or $R'_3$ and $R'_4$, or $R'_5$ and $R'_6$, or $R'_7$ and $R'_8$, or $R'_9$ and $R'_{10}$, or $R'_{11}$ and $R'_{12}$, or $R'_{13}$ and $R'_{14}$ substituents taken together may form an alkylene, alkenylene, or alkynylene group completing a 3, 4, 5, 6, 7, 8, 9 or 10 membered aromatic or alicyclic carbon ring, which ring may optionally include one or more degrees of unsaturation or one or more heteroatoms of nitrogen, sulfur, phosphorus, selenium, sulfinyl, sulfonyl or oxygen; and $X_1$ and $X_2$ are the same or different and are S, O, Se, $NR'_{17}$, or $PR'_{17}$, wherein $R'_{17}$ is hydrogen, alkylaryl, arylalkyl, alkyl or $R_1$.

Illustrative of useful $R'_1$, $R'_2$, $R'_3$, $R'_4$, $R'_5$, $R'_6$, $R'_7$, $R'_8$, $R'_9$, $R'_{10}$, $R'_{11}$, $R'_{12}$, $R'_{13}$ and $R'_{14}$ groups are hydrogen; hydroxyl; cyano; nitro; halo; alkyl such as methyl, ethyl, butyl, pentyl, octyl, nonyl, tert-butyl, neopentyl, isopropyl, sec-butyl, dodecyl and the like, alkenyl such as 1-propenyl, 4-butenyl, 1-pentenyl, 6-hexenyl, 1-heptenyl, 8-octenyl and the like; alkoxy such as propoxy, butoxy, methoxy, isopropoxy, pentoxy, nonyloxy, ethoxy, octyloxy, and the like; alkanoyl such as butanoyl, pentanoyl, octanoyl, ethanoyl, propanoyl and the like; arylamino and diarylamino such as phenylamino, diphenylamino and the like; alkylsulfinyl, alkylsulfonyl, alkylthio, arylsulfonyl, arylthio, and the like, such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, bezylthio, phenethylthio, sec-butylthio, naphthylthio and the like; alkoxycarbonyl such as methoxycarbonyl, ethoxycarbonyl, butoxycarbonyl and the like; alkyl amino and dialkylamino such as dimethylamino, methylamino, diethylamino, ethylamino, dibutylamino, butylamino and the like; cycloalkyl such as cyclohexyl, cyclopentyl, cyclooctyl, cycloheptanyl and the like; alkoxyalkyl such as methoxymethylene, ethoxymethylene, butoxymethylene, propoxyethylene, pentoxybutylene and the like; arylalkylamino such as methylphenylamino, ethylphenylamino and the like; aryloxyalkyl and aryloxyaryl such as phenoxyphenylene, phenoxymethylene and the like; and various substituted alkyl and aryl groups such as 1-hydroxybutyl, 1-aminobutyl, 1-hydroxylpropyl, 1-hydroxypentyl 1-hydroxyoctyl, 1-hydroxyethyl, 2-nitroethyl, trifluoromethyl, 3,4-epoxy-butyl, cyanomethyl, 3-chloropropyl, 4-nitrophanyl, 3-cyanomethyl, 1-hydroxymethyl, and the like; hydroxyl terminated alkyl and aryl groups such as, 2-hydroxy ethyl, 4-hydroxy butyl and 4-hydroxy phenyl; sulfonic acid, carboxylic acid and phosphoric acid terminated alkyl and aryl groups such as ethylsulfonic acid, propylsulfonic acid, butylsulfonic acid, phenylsulfonic acid, and the corresponding carboxylic and phosphoric acids and derivatives of said sulfonic, carboxylic and phosphoric acids as for example salts, esters and the like. Exemplary of other useful $R'_1$ to $R'_{14}$ groups are moieties of the formula:

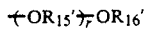

where r, $R'_{15}$ and $R'_{16}$ are as described above. Useful $R'_{15}$ groups include divalent moieties of the formulas $-(CH_2)_2-$, $-(CH_2)_3-$, $-(CH_2)_4-$ and $-(CH_2CH(CH_3))-$, and useful $R'_{16}$ groups include $-CH_3$, $-CH_2CH_3$ and $-(CH_2)_8CH_3$. Illustrative of substituents having such $R'_{15}$ and $R'_{16}$ are ethyleneglycol monomethylether, diethylene glycol monomethylether, triethylene glycol monomethylether, tetraethylene glycol, monomethylether, and the like.

Illustrative of $R'_{17}$ groups are hydrogen, methyl, ethyl, propyl, hexyl, octyl, nonyl, phenyl, benzyl, vinyl, allyl, dodecylphenyl, phenethyl, phenylpropyl, 2,4-dimethylphenyl, 4-methylphenyl and the like.

Coating polymers for use in the practice of this invention may vary widely, the only requirement is that they are comprised of conjugated backbone polymers. Polymers with oxidation potentials less than about 3.5 V vs Li/Li+ are more preferred for use in the practice of this invention. Of these more preferred polymers, preferred for use in the practice of this invention are homopolymers, and random or block copolymers of the above Formulas I to XIV in which:

m, and the sum of n, o and p are natural numbers at least about 40, preferably at least about 50, with the proviso that at least one of n or o is not zero;

q is an integer from 0 to about 4;

$R'_1$, $R'_2$, $R'_3$ and $R'_4$ are the same or different at each occurrence and are hydrogen or hydroxyl or alkyl having from 1 to about 20 carbon atoms, such as methyl, ethyl, propyl, isopropyl, n-butyl, sec-butyl, isobutyl, n-pentyl, isopentyl, sec-pentyl, tert-pentyl, n-hexyl, n-octyl, n-nonyl, n-decyl, and n-dodecyl; phenyl; alkylphenyl such as 2,4-dimethylphenyl, 4-methylphenyl, 4-ethylphenyl, and 4-butylphenyl; phenylalkyl such as benzyl, phenethyl; alkxoy having from 1 to about 12 benzyl, phenethyl; alkxoy having from 1 to about 12 carbon atoms such as methoxy, ethoxy, and propoxy; alkanoyl having from 1 to 20 carbon atoms such as formyl, acetyl, and propionyl; alkylthio having from 1 to 20 carbon atoms such as methylthio, ethylthio, propylthio, dodecylthio and butylthio; alkoxyalkyl having from 1 to 20 carbon atoms such methoxymethyl, ethoxyethyl and heptoxypropyl; alkenyl having from 1 to about 20 carbon atoms such as allyl, vinyl and 3-butenyl; or phenyl and alkyl substituted with phosphonic acid and derivatives thereof, cyano, nitro, epoxy, hydroxyl, carboxylic acid and derivatives, sulfonic acid and derivatives, or halo substituents such as trifluoromethyl, 3,4-epoxybutyl, cyanomethyl, 2-nitroethyl, 3-chloropropyl, 4-nitrophenyl, hydroxyethyl, $-CH_2CH_2CH_2SO_3H$; $-CH_2CH_2CH_2P(O)(OH)_2$; and $-CH_2CH_2CH_2CO_2H$: or moiety of the formula:

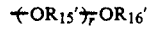

wherein:

$R'_{15}$ is divalent alkylene having from 1 to about 4 carbon atoms;

$R'_{16}$ is alkyl having from 1 to about 10 carbon atoms; and r is a natural number from 1 to about 25 such as ethylene glycol monomethylether and the like; or any of $R'_1$ and $R'_2$, or $R'_3$ and $R'_4$, substituents taken together may form an alkylene, alkenylene or alkynylene chain having from 2 to 20 carbon atoms completing a 4, 5, 6, 7, 8, 9 or 10 membered ring system(s) which may include one or more degrees of unsaturation or one or more heteroatoms of oxygen, nitrogen or sulfur such as 1,4-butandiyl, 1,2-ethanediyl, $-CH_2SCH_2-$, $-CH_2OCH_2-$, $-CH_2CH_2-NH-CH_2-$, or $-CH_2CH_2-NH-$;

$R'_5$ to $R'_{14}$ are the same or different at each from 1 to about 12 carbon atoms, phenyl, alkylthio having from 1 to about 12 carbon atom or alkoxy having from 1 to about 12 carbon atoms; alkoxyalkyl having from 2 to about 12 carbon atoms; alkylamino having about 1 to about 12 carbon atoms alkyl; or phenyl substituted with hydroxyl, acid functional groups, such as sulfonic acid, carboxylic acid, phosphonic acid, phosphoric acid, phosphinic acid, sulfinic acid and the derivatives thereof, such as salts, esters, and the like; cyano, nitro, epoxy, or halo substituents or any of $R'_5$ and $R'_6$, or $R'_7$ and $R'_8$, or $R'_9$ and $R'_{10}$, or $R'_{11}$ and $R'_{12}$ or $R'_{13}$ and $R'_{14}$ substituents together may form an alkenylene, alkynylene or alkylene chain having 2 to about 20 carbon atoms completing a 4, 5, 6, 7, 8, 9 or 10 membered ring system(s) which may include one or more degrees of unsaturation or one or more heteroatoms of oxygen, sulfur, or nitrogen such as 1,4-butandiyl, 1,2-ethanediyl, $-CH_2SCH_2-$ or $-CH_2OCH_2-$; and $X_1$ and $X_2$ are the same or different and are oxygen, sulfur or $NR_{17}$ wherein $R'_{17}$ is hydrogen or alkyl or aryl.

Particularly preferred for use in the practice of this invention are homopolymers and random copolymers of the above-referenced Formula I to XIV wherein:

q is an integer from 0 to about 3;

m, and the sum of n, o and p are at least about 100 with the proviso that at least one of n or o is not zero;

$R'_1$, $R'_2$, $R'_3$ and $R'_4$ are the same or different at each occurrence and are hydrogen; hydroxyl; alkyl having from 1 to about 12 carbon atoms such as ethyl, methyl, propyl, n-butyl, sec-butyl, n-hexyl, n-octyl, and n-dodecyl; phenyl; alkoxy or alkylthio having from 1 to about 12 carbon atoms such as methylthio, ethylthio, propylthio, butylthio, methoxy, ethoxy and 1 to about 12 carbon atoms such as methylthio, ethylthio, propylthio, butylthio, methoxy, ethoxy and butoxy; alkoxyalkyl having from 1 to about 12 carbon atoms; or a moiety of the formula:

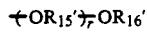

wherein:
$R_{15}$ is alkylene of about 2 to 3 carbon atoms;
$R_{16}$ is alkyl of from 1 to about 10 carbon atoms; and
r is a natural number from 1 to about 10;
$R'_5$, $R'_6$, $R'_7$, $R'_8$, $R'_9$, $R'_{10}$, $R'_{11}$, $R'_{12}$, $R'_{13}$ and $R'_{14}$ are the same or different at each occurrence and are hydrogen; hydroxyl; alkyl, such as methyl, ethyl or the like; substituted alkyl such as butylsulfonic acid, propylsulfonic acid, cyanomethyl, epoxybutyl, pentafluoroethyl, nitropropyl, and butylcarboxylic acid; alkoxy such as methoxy, ethoxy, butoxy, and the like; and alkylthio such as methylthio, ethylthio and the like; or any of $R'_5$ and $R'_6$, $R'_7$ and $R'_8$, $R'_9$ and $R'_{10}$, or $R'_{11}$ and $R'_{12}$, or $R'_{13}$ and $R'_{14}$ together may be an alkenylene or alkylene chain forming an alicyclic, aromatic or heteroaromatic ring;
$X_1$ and $X_2$ are the same or different and are oxygen, sulfur or —$NR'_{17}$ where $R'_{17}$ is hydrogen or alkyl having from 1 to about 10 carbon atoms.

Amongst these particularly preferred embodiments, most preferred are copolymers and homopolymers of Formula I to XIV in which:
q is an integer from 0 to about 2;
m, or the sum of n, o and p is at least about 125 with the proviso that at least one of n or o is not zero;
$R'_1$ to $R'_4$ are the same or different at each occurrence and are hydrogen, or alkyl, alkoxy or

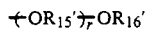

wherein:
$R'_{15}$ is —$(CH_2)_2$— or —$(CH_2CH(CH_3))$—;
$R'_{16}$ is —$CH_3$ or —$CH_2CH_3$; and
r is a natural number 1 to about 6;
$R'_5$, $R'_6$, $R'_7$, $R'_8$, $R'_9$, $R'_{10}$, $R'_{11}$, $R'_{12}$, $R'_{13}$ and $R'_{14}$ are the same or different at each occurrence and are hydrogen, hydroxyl, alkyl, or any of $R'_5$ and $R'_6$, $R'_7$ and $R'_8$, $R'_9$ and $R'_{10}$, or $R'_{11}$ and $R'_{12}$, or $R'_{13}$ and $R'_{14}$ together may form a divalent alkylene or alkenylene chain forming an alicyclic, aromatic and/or heteroaromatic ring; and
$X_1$ and $X_2$ are sulfur or $NR'_{17}$ where $R'_{17}$ is hydrogen or alkyl having from 1 to about 7 carbon atoms.

Still other preferred electrically conductive polymers are polyanilines. As used herein, "polyanilines" are homopolymers or copolymers in which at least 50 mole % of the recurring backbone monomeric units in vary ratio are selected from the group consisting of substituted or unsubstituted phenyl rings and amine linkages (—NH— or —NR— where R is substituent other than hydrogen) with varying amounts of substituted or unsubstituted quinoid rings and imine (—N═) linkages. As used herein, "neutral or undoped polyaniline" is characterized by an uncharged backbone, "polyaniline base" is a particular form of undoped polyaniline which contains at least one quinoid diamine linkage in the backbone and "electrically conductive or doped polyaniline" is characterized by a charged backbone which may be formed by a partial or complete protonation of the amine and/or imine nitrogen atoms.

Any form of such polyanilines can be conveniently used in the practice of this invention. Illustrative of useful forms are those described in Green, A. G. and doped polyaniline" is characterized by a charged backbone which may be formed by a partial or complete protonation of the amine and/or imine nitrogen atoms.

Any form of such polyanilines can be conveniently used in the practice of this invention. Illustrative of useful forms are those described in Green, A. G. and Woodhead, A. E., CXVII-Aniline-black and Allied Compounds, Part III", *J. Chem, Soc.*, 101 pp. 1117 (1912) and Kobayashi, et al., "Electrochemical Reactions . . . of Polyaniline Film-Coated Electrodes", *J. Electroanal, Chem.*, 177, pp. 281–91 (1984) and in Shacklette, L. W., et al. "Structure and Properties of Polyaniline as Modeled by Single-Crystal Oligomers", *J. Chem, Phys*, 88 P 3955 (1988), which are hereby incorporated by references.

In the preferred embodiments of the invention, polyanilines for use in the invention are homopolymers and copolymers of the type derived from the polymerization of unsubstituted and substituted anilines of the Formula XV:

wherein:
n is an integer from 0 to 5;
m is an integer from 0 to 5, with the proviso that the sum of n and m is equal to 5 and with the further proviso that at least one position on the aniline ring, preferably at the para position, is substituted with a substituent which will allow coupling of the aniline units, such halogen, hydrogen or other leaving group;
$R_1$ is the same or different at each occurrence and is selected from the group consisting of alkyl, deuterium, alkenyl, alkoxy, cycloalkyl, cycloalkenyl, alkanoyl, alkylthio, aryloxy, alkylthioalkyl, alkylaryl, arylalkyl, amino, alkylamino, dialkylamino, arylamino, diarylamino, alkylarylamino, aryl, alkylsulfinyl, aryloxyalkyl, alkylsulfinylalkyl, alkoxyalkyl, phosphonic acid, alkylsulfonyl, arylthio, alkylsulfonylalkyl, boric acid, phosphoric acid, sulfinate salts, arylsulfinyl, alkoxycarbonyl, arylsulfonyl, carboxylic acid, phosphonic acid, halo, hydroxy, cyano, sulfinic acid, carboxylate salts, borate salts, phosphate salts, sulfonate salts, phosphinate salts, phosphonate salts, phosphonic acid, sulfonic acid, nitro, alkylsilane, or any of the foregoing aryl, aliphatic or cycloaliphatic groups substituted with one or more phosphonic acid, sulfonic acid, phosphoric acid, boric acid, carboxylate salt, borate salt, sulfonate salt, phosphinate salt, phosphonate salt, phosphate salt, phosphinic acid, carboxylic acid, halo, nitro, amino, alkylamino, dialkylamino, arylamino, diarylamino, alkylarylamino, cyano or epoxy moieties; or any two $R_1$ groups together or any $R_1$ group together with any $R_2$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, ester, carbonyl, sulfonyl, or oxygen atoms wherein permissible substituents are one or more phosphonic acid, sulfonic acid, phosphoric acid, boric acid, carboxylate salt, borate salt, sulfonate salt, phosphinate salts, phosphonate salt, phosphate salt, phosphinic acid, carboxylic acid, halo, nitro, amino, alkylamino, dialkylamino, arylamino, diarylamino, alkylarylamino, cyano or epoxy moieties; or $R_1$ is an aliphatic moiety having repeat units of the formula:

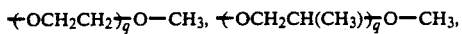

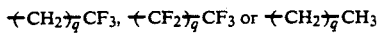

wherein
q is a positive whole number; and
$R_2$ is selected from the group consisting of permissible $R_1$ substituents and hydrogen.

Illustrative of useful $R_1$ groups are hydrogen, alkyl, such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; amino, such as methylanino, ethylamino, butylamino and the like; dialkylamino, such as dimethylamino, methylethylamino and the like; arylamino such as phenylamino, p-methylphenylamino and the like; diarylamino, such as diphenylamino, p-nitrophenyl-p'-methylphenylamino and the like; alkylarylamino, such as 2-phenyl-4-methylanino and the like; alkylsulfinyl, alkylsulfonyl, alkylthio, arylthio, arylsulfinyl, and arylsulfonyl such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclo-octyl, cycloheptyl and the like; alkoxyalkyl such as methoxy-methyl, ethoxymethyl, butoxymethyl, propoxyethyl, pentoxybutyl and the like; aryloxyalkyl and aryloxyaryl such as phenoxyphenyl, phenoxymethyl and the like; and various substituted alkyl and aryl groups such as 1-hydroxybutyl, 1-aminobutyl, 1-hydroxypropyl, 1-hydroxypentyl, 1-hydroxyoctyl, 1-hydroxyethyl, 2-nitroethyl, trifluoromethyl, 3,4-epoxybutyl, cyanomethyl, 3-chloropropyl, 4-nitrophenyl, 3-cyanophenyl, and the like; acid and acid salts such as sulfonic acid, carboxylic acid and salts thereof; aliphatic or aryl groups substituted with an acid or salt thereof such as phosphonic acid, phosphinic acid, sulfonate salt, sulfinate salt, sulfonic acid, sulfinic acid, borate salt, phosphoric acid, boric acid, or carboxylic acid groups such as ethylsulfonic acid, propylsulfonic acid, 4-nitrobenzene sulfonic acid, butylsulfonic acid, phenylsulfonic acid, and the like.

Also illustrative of useful $R_1$ groups are divalent moieties derived from any two $R_1$ groups or a $R_1$ group with a $R_2$ group such as moieties having from about 2 to about 7 repeat units of the formula:

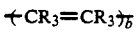

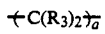

wherein $R_3$ is the same or different at each occurrence and is hydrogen or alkyl, as for example

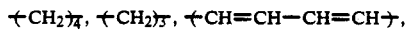

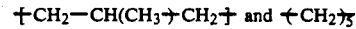

and groups comprised of such moieties which include one or more heteroatoms of oxygen, nitrogen, ester, sulfonyl, carbonyl, sulfinyl, and/or sulfur, such as $-CH_2SCH_2-$ $-CH_2NHCH_2-$, $-SCH_2NHCH_2-$, $-O-CH_2-CH_2O-$ $-O-CH_2-S-CH_2-$, $-CH_2S(O_2)CH_2-$, $-CH_2S(O)CH_2-$, $-OC(O)CH_2CH_2-$, $-CH_2C(O)CH_2-$ and $-CH_2-O-CH_2-$ to form heterocyclic amino compounds such as tetrahydronaphthylamine, dihydrobenzopyrroleamine, benzofuranamine, dihydrobenzopyranamine, dihydrobenzofuranamine, dihydrobenzoparaoxazineamine, dihydrobenzoparadiazineamine, dihydrobenzotriazoleamine, dihydro-benzothiazineamine,benzothiopyranamine, dihydro-benzoxazoleamine and the like. Exemplary of useful $R_3$ groups are divalent alkenylene chains containing 1 to about 3 unsaturated bonds such as divalent 1,3-butadiene and like moieties which may also include one or more divalent oxygen, nitrogen, sulfinyl, sulfonyl, carbonyl, ester, and/or sulfur groups which form such compounds as benzodiazineamine, benzodiazoleamine, benzotriazepine-amine, benzimidazolylamine, benzisoxazoleamine, benzoxazolylamine, benzothiazineamine, benzoxazineamine, naphthaleneamine, benzopyranamine, benzothiazineamine, anthraceneamine, aminobenzothio-pyran,aminobenzodiazine, benzthiopyrone amine, amino-coumarin, benzthiopheneamine, benzothiodiazoleamine, and the like.

Exemplary of useful $R_2$ groups are hydrogen and the above-referenced representative $R_1$ groups described above such as alkyl as for example, methyl, ethyl, isopropyl, butyl, isobutyl, hexyl, octyl and the like; alkylsulfonyl such as methylsulfonyl, ethylsufonyl, propylsulfonyl and the like; arylsulfonyl such as phenylsulfonyl, p-methyl phenylsulfonyl, naphthylsulfonyl and the like.

Preferred polyanilines for use in the practice of this invention are those of the type derived from aniline of the above Formulas XV.

or is a derivative of said polyaniline, wherein:
n is an integer from 0 to about 2;
m is an integer from 2 to 4, with the proviso that the sum of n and m is equal to 4;

$R_1$ is aryl, alkyl or alkoxy having from 1 to about 30 carbon atoms, cyano, halo, sulfonic acid, carboxylic acid, boric acid, borate salt, phosphoric acid, phosphate salt, phosphonic acid, phosphonate salt, phosphinic acid, phosphinate salt, sulfinic acid, sulfinate salt, carboxylate salt, sulfonate salt, amino, alkylamino, dialkylamino, arylamino, hydroxy, diarylazino, alkylarylamino, or alkyl, aryl or alkoxy substituted with phosphonic acid, phosphate salt, phosphoric acid, borate salt, sulfonate salt, amino, alkylamino, dialkylamino, arylamino, diarylamino, alkylarylamino, carboxylate salt, hydroxy, alkoxy, phosphonic acid, boric acid, alkyl, phosphinic acid, phosphonate salt, phosphinate salts, carboxylic acid or sulfonic acid substituents; and $R_2$ is the same or different at each occurrence and is a $R_1$ substituent or hydrogen.

Particularly preferred polyanilines for use in the practice of this invention are those of the type derived from head to tail polymerization of anilines of the above Formula XV or derivaties of said polyanilines in which:

n is an integer from 0 to 1;

m is an integer from 3 to 4, with the proviso that the sum of n and m is equal to 4;

$R_1$ is aryl, alkyl or alkoxy having from 1 to about 20 carbon atoms, sulfonic acid, halo, carboxylic acid, amino, carboxylate salt, alkylamino, phosphonate salt, dialkylamino, arylamino, phosphonic acid, boric acid, phosphate salt, phosphoric acid, borate salt, diarylamino, alkylarylamino, or alkyl or aryl substituted with carboxylic acid, phosphoric acid, boric acid, phosphate salt, phosphonic acid, borate salt, sulfonate salt, amino, alkylamino, dialkylamino, arylamino, diarylamino, alkylarylamino, carboxylate salt, halo, phosphonate salt, or sulfonic acid substituents; and $R_2$ is the same or different at each occurrence and is a $R_1$ subsituent or hydrogen.

The following listing of substituted and unsubstituted anilines are illustrative of those which can be used in the practice of this invention.

| | |
|---|---|
| 2-Cyclohexylaniline | 2-Acetylaniline |
| Aniline | 2,5-Dimethylaniline |
| o-Toluidine | 2,3-Dimethylaniline |
| 4-Propanoylaniline | N, N-Dimethylaniline |
| 2-(Methylamino)aniline | 4-Benzylaniline |
| 2-(Dimethylamino)aniline | 4-Aminoaniline |
| 2-Methyl-4-methoxy-carbonylaniline | 2-Methylthiomethylaniline |
| | 4-(2,4-Dimethylphenyl)aniline |
| 4-Carboxyaniline | 2-Ethylthioaniline |
| N-Methyl aniline | N-Methyl-2,4-Dimethylaniline |
| N-Propyl aniline | N-Propyl-m-Toluidine |
| N-Hexyl aniline | N-Methyl-o-Cyanoaniline |
| m-Toluidine | 2,5-Dibutylaniline |
| o-Ethylaniline | 2,5-Dimethoxyaniline |
| m-Ethylaniline | Tetrahydronaphthylamine |
| o-Ethoxyaniline | o-Cyanoaniline |
| m-Butylaniline | 2-Thioacetylaniline |
| m-Hexylaniline | 2,5-Dichloroaniline |
| m-Octylaniline | 3-(n-Butanesulfonic acid) aniline |
| 4-Bromoaniline | |
| 2-Bromoaniline | 3-Propoxymethylaniline |
| 3-Bromoaniline | 2,4-Dimethoxyaniline |
| 3-Acetamidoaniline | 4-Mercaptoaniline |
| 4-Acetamidoaniline | 4-Ethylthioaniline |
| 5-Chloro-2-methoxy-aniline | 3-phenoxyaniline |
| 5-Chloro-2-ethoxy-aniline | 4-phenoxyaniline |
| N-Hexyl-m-toluidine | N-Octyl-m-toluidine |
| 4-Phenylthioaniline | 4-Trimethylsilylaniline |
| 3-Amino-9-methylcarbazole | 3-Amino carbazole |
| 4-Amino carbazole | N-(p-Amino phenyl) aniline |

In the preferred embodiments, the polymer is polyaniline. As used herein, "polyaniline" consists of repeat units of the Formulas XVI or XVII:

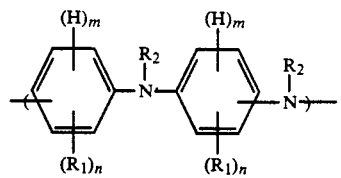

Formula XVI

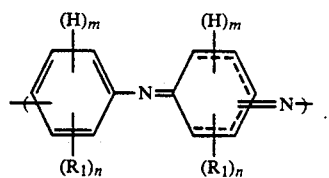

Formula XVII a combination thereof having various ratios of the above repeat units in the polyaniline backbone such as leucoemeraldine, protoemeraldine, emeraldine, nigraniline and pernigraniline.

Illustrative of these preferred polyanilines useful in the practice of this invention are those of the Formulas XVIII to XXI:

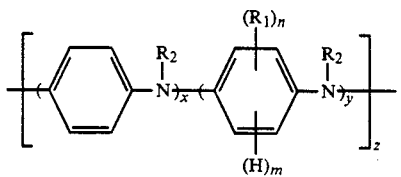

XVIII

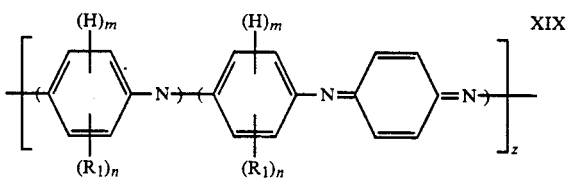

XIX

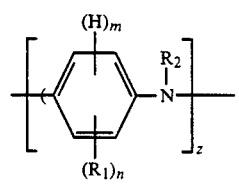

XX

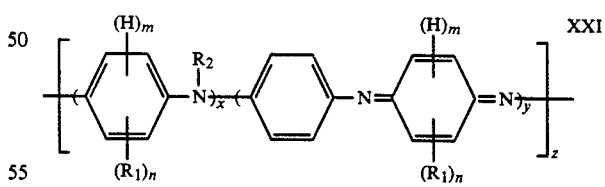

XXI wherein:

n, m, $R_1$ and $R_2$ are as described above;

x and y are the same or different at each occurrence and are integers equal to or greater than 0, with the proviso that the sum of x and y is greater than 0, preferably were x is an integer equal to or greater than 0 and/or that the ratio of x to y is greater than or equal to about 0, more preferably said ratio is equal to or greater than 0.5 and most preferably said ratio is equal to or greater than about 1; and z is the same or different at each occurrence and is an integer equal to or greater than 1.

Preferred for use in the practice of this invention are polyanilines of the above Formulas XVIII to XXI in which:

n is an integer from 0 to about 3;

m is an integer from 1 to 4, with the proviso that the sum of n and m is equal to 4;

$R_1$ is alkyl, aryl or alkoxy having from 1 to about 30 carbon atoms, sulfinic acid, sulfinate, sulfinic acid salt, amino, alkylamino, dialkylazino, arylazino, diarylamino, hydroxyamino, hydroxy, phosphinate alkylsulfonyl, arylsulfonyl, sulfonic acid, sulfonate, phosphinic acid, phosphinic acid salt, phosphinate carboxylic acid, carboxylate, phosphonic acid, phosphonate, phosphonic acid salt, cyano, halo, or alkyl, aryl or alkoxy substituted with one or more phosphonic acid, phosphoric acid, borate, sulfonate, carboxylate, phosphonate, phosphonic acid salt, boric acid, phosphinic acid, phosphinate, phosphinic acid salt, sulfinic acid, sulfinate, sulfinic acid salt, carboxylic acid or sulfonic acid substituents;

$R_2$ is the same or different at each occurrence and are hydrogen, sulfinic acid, sulfinic acid salt, sulfonate, sulfinate, sulfonic acid, phosphinic acid, phosphinate, phosphinic acid salt, carboxylic acid, carboxylate, phosphonic acid, phosphonate, phosphonic acid salt, or phenyl or alkyl substituted with sulfonic acid, sulfonate, phosphinic acid, phsophinate, phosphonic acid salt, carboxylic acid, carboxylate, sulfinic acid, sulfinate, sulfinic acid salt, boric acid, borate, phosphonic acid or phosphonate, phosphonic acid salt substituents;

x is an integer equal to or greater than 1;

y is equal to or greater than 0, with the proviso that the ratio of x to y is equal to or greater than 0.5;

z is an integer equal to or greater than about 5;

Particularly preferred for use in the practice of this invention are polyanilines of the above Formulas XVIII to XXI in which:

n is an integer from 0 to 2;

m is an integer from 2 to 4, with the proviso that the sum of n and m is equal to 4;

$R_1$ is alkyl, alkoxy, amino, alkylamino, dialkylamino, arylamino, diarylamino, hydroxyamino, hydroxy, alkylsulfonyl, aryloulfonyl, carboxylic acid, carboxylate, phosphinic acid salt, phosphinic acid, sulfonic acid, sulfonate, sulfinic acid, phosphonic acid, sulfinic acid salt, phosphonic acid salt, or alkyl substituted with carboxylic acid, phosphinic acid, sulfinic acid, phosphinic acid salt, halo, sulfinic acid salt, sulfonate, carboxylate, phosphonic acid, phosphonic acid salt, or sulfonic acid substituents; wherein the aliphatic components of $R_1$ substituents include from 1 to about 30 carbon atoms and the aryl components of any $R_1$ substituent include from 6 to about 30 carbon atoms;

$R_2$ is the same or different at each occurrence and are hydrogen, alkyl, carboxylic acid, amino, alkylamino, dialkylamino, arylamino, diarylamino, hydroxyamino, hydroxy, alkylsulfonyl, arylaulfonyl, sulfinic acid, sulfonic acid salt, carboxylate, phosphinic acid salt, sulfonic acid, phosphonic acid, sulfinic acid salt, phosphonic acid salt, or alkyl substituted with one or more carboxylic acid, sulfinic acid, sulfinic acid salt, carboxylate, phosphinic acid salt, phosphinic acid, sulfonic acid, sulfinate salt, phosphonic acid or phosphonic acid salt substituents; wherein the aliphatic components of any $R_2$ substituent include from 1 to about 30 carbon atoms and the aryl components of any $R_2$ substituent include from 6 to 30 carbon atoms;

x is an integer equal to or greater than 2;

y is equal to or greater than 0, with the proviso that the ratio of x to y is greater than about 1; and z is an integer equal to or greater than about 10.

Amongst the particularly preferred embodiments, most preferred for use in the practice of this invention are polyanilines of the above Formulas XIX or XXI in which:

n is an integer from 0 to 1;

m is an integer from 3 to 4, with the proviso that the sum of n and m is equal to 4;

$R_1$ is alkyl of from 1 to about 20 carbon atoms, carboxylic acid, carboxylate, sulfonic acid, sulfonate, sulfinic acid, sulfinic acid salt, phosphinic acid, phosphinic acid salt, or alkyl of from 1 to about 20 carbon atoms substituted with one or more halo, carboxylic acid, carboxylate, sulfonic acid, sulfonate, sulfinic acid, sulfinic acid salt, phosphinic acid or phosphinic acid salt, phosphonic acid, phosphonic acid salt, substituents;

$R_2$ is carboxylic acid, methyl, ethyl, carboxylate, carboxylic acid, sulfonic acid, sulfonate, sulfinic acid, phosphinic acid, phosphinic acid salt, sulfinate, phosphonic acid, phosphonic acid salt, salt or hydrogen;

x is an integer equal to or greater than 2; and y is an integer equal to or greater than 1, with the proviso that the ratio of x to y is greater than 1; and z is an integer equal to or greater than about 10.

In the most preferred embodiment of the invention n is 0;

m is 4;

x is an integer equal to or greater than 2;

y is an integer equal to or greater than 1 with the proviso that the ratio of x to y is greater than 1; and z is an integer equal to or greater than about 10. In the most preferred embodiments of this invention, the polyaniline is derived from aniline or N-alkylaniline either unsubstituted or substituted with at least one sulfonate, sulfonic acid, alkyl or alkoxy. Polyaniline derived from unsubstituted aniline polyaniline of choice.

In general, the number of in the conjugated, backbone honopolymer or copolymer repeat units are not critical and may vary widely. The greater the number of repeat units the greater the viscosity and molecular weight of the conjugated backbone homopolymer or copolymer. In those applications where a conjugated backbone homopolymers or copolymers of relatively low molecular weight and viscosity is required, such materials may be used, and in those applications where a conjugated bakcbone hompolymer or copolymer of relatively high molecular weight and viscosity is required, then such materials can be used. The number of repeat units is at least about 10. The upper limit can vary widely depending on the desired molecular weight and viscosity and the required degree of processibility, such as melt processability, solution processibility and the like. In the preferred embodiments of the invention, the number of repeat units is at least about 20, and in the particularly preferred embodiments, the number of repeat units is at least about 30. Amongst the particularly preferred embodiments, most preferred are those embodiments in which the number of repeat units is at least about 40.

Conjugated backbone homopolymers and copolymers can be conveniently prepared throught conventional procedures. Such procedures are well known in the art and will not be described herein in great detail. See for example U.S. Pat. Nos. 4,940,640; 4,711,742; 4,521,589; 4,808,681; 4,983,322; 5,006,278 and 4,900,782 and "The Handbood of Conducting Polymers", edited by Terje A. Skotheim, Marcell Dikker, Inc. New York and Basel and references cited therein, all of which is hereby incorporated by reference. For example, preferred polyanilines can be prepared through use of chemical and electrochemical synthetic procedures. For example, one form of polyaniline can be prepared by treating aniline with ammonium persulfate $(NH_4)_2S_2O_8$ in excess 1M HCl. This powdered form of polyaniline is blue green in color. After methanol washing and air drying this material exhibits a conductivity of about 5 S/cm. This conductive form of polyaniline can be treated with ammonium hydroxide in ethanol to form a non-conductive form of polyaniline which is purple in color and which has a conductivity of less than $10^{-10}$ S/cm. Other chemical procedures for preparation of various chemical forms of polyaniline are described in detail in Green et al and U.S. Pat. Nos. 4,855,361, 4,798,685, 4,806,271, 4,822,638, 4,851,487 and 4,940,517 described above.

Useful forms of polyaniline can also be prepared electrochemically. For example, useful forms of polyaniline can be prepared by the electrochemical oxidation of aniline in aqueous fluoroboric acid electrolyte on a platinum foil anode.

Other chemical and electrochemical syntheses and transformations of the conductive form of polyaniline may be discovered and are presently contemplated as being useful. Moreover, additional forms or types of polyaniline may be elucidated in the future. Accordingly, no limitation to the syntheses, transformation, or structures herein described or postulated is intended beyond the limitations of the appended claims.

The conjugated backbone homopolymer or copolymer is doped with a suitable dopant to render the polymer electrically conductive, i.e. an electrical conductivity of at least about $10^{-9}$ ohm$^{-1}$ cm$^{-1}$ by the four-in-line probe method. Any doping procedure may be used. Such methods are conventional and will not be discribed herein in any great detail. For example, the conjugated backbone homopolymer or copolymer is best doped by contacting the dopant with the polymer for a time sufficient to doped in the desired extent. The polymer can be contacted with the dopant in the gaseous state, in the liquid state, neat, or diluted by some suitable dilutent such as a gas as for example air, or liquid such as water, or an organic liquid. The dopant can be contacted with the conjugated backbone homopolymer or copolymer either during polymerization or after polymerization. In a preferred embodiment of the invention, the conjugated backbone homopolymer or copolymer may be doped in either by carrying out the polymerization in the presence of an acid having a pKa in the solution equal to or less than that of the homopolymer or copolymer. In general, the higher the pKa of the conjugated backbone homopolymer or copolymer, the higher the acid pKa can be used to provide a conductive polymer; and conversely, the lower the pKa of the conjugated backbone polymer the lower the pKa of the acid can be used to provide a desired degree of electrical conductivity. The pKa of the acid is preferably equal to or less than about 5, more preferably,.equal to or less than about 4, and the most preferably euqal to or less than about 3.

In another preferred embodiment of the invention, the conjugated backbone copolymer or homopolymer can be doped after polymerization. For example, the conjugated backbone homopolymer or copolymer layer is doped by contact with a solution of the dopant in a suitable solvent such as water.

Dopants for use in the practice of this invention can vary widely and can be such materials which are known in the art for use in doping conjugated backbone homopolymers or polymers to form conductive or semi-conductive polymers, as for example, those described in detail in U.S. Pat. Nos. 4,442,187 and 4,321,114 which are hereby incorporated by reference. Illustrative of useful dopant species are oxidizing dopants. Oxidizing dopants are well known in the conductive polymer art, and any of such known oxidizing dopants can be used. Illustrative of useful oxidizing dopants are $AsF_5$, $MoOCl_4$, $MoCl_5$, $PCl_5$, $POCl_3$, $PCl_3$, $AlCl_3$, $NO^+$ and $NO_2^+$ salts (such as $NOBF_4$, $NOPF_6$, $NOSbF_6$, $NOAsF_6$, $NOCH_3CO_2$, $NO_2BF_4$, $NO_2PF_6$, $NO_2AsF_6$, $NO_2SbF_6$, and $NO_2CF_3SO_2$), $HClO_4$, $HNO_3$, $H_2SO_4$, benzoylperoxide, $SO_3$, $Br_2$, $(FSO_3)_2$, $ZnCl_2$, $FSO_3H$, and FE(III) salts (such as $Fe(BF_4)_3$, $FeBr_3$, $Fe(CH_3SO_3)_3$, $Fe(ClO_4)_3$, $FeCl_3$, $Fe(OTs)_3$, and $Fe(CF_3SO_3)_3$ which give rise to doped polymers containing dopant ions such as $NO_3^-$, $CH_3SO_3^-$, $AlCl_4^-$, $BF_4^-$, $ZnCl_4^-$, $PCl_4^-$, $PF_6^-$, $AsF_6^-$, $SbF_6^-$, $CF_3SO_3^-$, $ClO_4^-$, $OTs^-$, $SO_3^{-2}$, $C_6H_5CO_2^-$, $CH_3SO_3^-$, $FSO_3^-$, and $FeCl_4^-$. Other useful oxidizing dopants include electrolyte salts such as $LiClO_4$, $LiBF_4$, $LiAsF_6$, $NaPF_6$, $BU_4NClO_4$, $Bu_4NOTs$, $BU_4NCF_3SO_3$, $LiCF_3SO_3$, $AgOTs$, and the like. Preferred oxidizing dopants for use in the practice of this invention are oxidizing dopants selected from the group consisting of $MoOCl_4$, $MoCl_5$, $PCl_5$, $POCl_3$, and Fe (III) salts such as $Fe(ClO_4)_3$, $FeCl_3$, $FeBr_3$, and $Fe(CF_3SO_3)_3$, and particularly preferred oxidizing dopants for use in the practice of this invention are dopants selected from the group consisting of $MoOCl_4$, $MoCl_5$, $PCl_5$, $POCl_3$, $FeBr_3$ and $FeCl_3$. Amongst these particularly preferred embodiments, most preferred oxidizing dopants are those embodiments in which the oxidizing dopant is $FeCl_3$.

Illustrative of other dopants are protonic acid dopants. Such dopants include inorganic acids, such as hydrofluoric acid, hydroiodic acid, phosphoric acid, nitric acid, boric acid, sulfuric acid and the like.

Illustrative of still other useful dopants are non-oxidizing protonic acids such as those containing anionic moieties of the formula:

$$R_4(PO_3^=)_r(PO_2(R_6)^-)_r(BO_2^=)_r(SO_3^-)_r$$
$$(CO_2^-)_r(PO_2^=)_r(PO(R_6)^-)_r(SO_2^-)_r$$

and having one or more cationic moieties selected from the group consisting of:

$$M^{+s}$$

wherein:

$R_4$ and $R_6$ are the same or different at each occurrence and are organic or inorganic radical or amino;

M is a species having a positive charge equal to s, provided that at least one of $M^{+s}$ is a proton or a moiety which can be transformed by radiation, heat, chemicals and the like, into a proton under use conditions such as $NH_4^+$, $^+N(CH_3)_2H_2$, $^+N(C_2H_5)H_3$, $Ph_3S^+$, and the like;

s is the same or different at each occurrence and is an integer equal to 1 to 8;

r is the same or different at each occurrence and is 0 or a positive integer equal to or greater than 1, with the proviso that at least one of r is other than 0.

The $R_4$ and $R_6$ group may vary widely and can be a substituted or unsubstituted aliphatic radical such as alkyl, nitroalkyl, haloalkyl and the like, or a substituted or unsubstituted aromatic radical such as phenyl, halophenyl, nitrophenyl, anthracyl, naphthyl, phenanthryl and the like. $R_4$ and $R_6$ groups may also be a polymeric radical such as a polymer having recurring pendant phenyl groups in the polymeric backbone substituted with sulfonic acid and derivatives thereof such as salts, phosphoric acid and derivatives thereof such as salts, phosphonic acid and derivatives thereof such as salts, sulfinic acid and derivatives thereof such as salts, carboxylic acid and derivatives thereof such as salts, boric acid and derivatives thereof such as salts, or phosphonic acid and derivatives thereof such as salts; moieties such as sulfonated or phosphonated polystyrene, poly(2-methylstyrene), poly(4-phenylstyrene), poly(2-vinyl naphthalene), poly(vinyl benzoate), poly(benzyl methacrylate) and the like. In the particularly preferred embodiments of the invention, $R_4$ and $R_6$ are aromatic radical and in the most preferred embodiments $R_4$ and $R_6$ are substituted or unsubstituted phenyl or naphthyl. The nature of the $M^{+n}$ group may vary widely. For example, $M^{+n}$ may be be a non-metal cation such as $BU_4N^+$, $H^+$, $NO^+$, $NO_2^+$, $NH_4^+$, $^+N(CH_3)_2H_2$, $^+N(C_2H_5)H_3$, and the like, or may be a metal cation such as $Na^+$, $Li^+$, $Ag^+$, $Ba^{+2}$, $CO^{+3}$, $Al^{+3}$, $Fe^{+3}$ and the like.

Preferred for use in the practice of this invention are organic acid dopants, more preferably those having anionic moieties of the formulas:

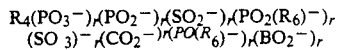

and having a cationic moiety of the Formula:

wherein at least one of the cationic moieties of the formula $M^{+s}$ is a proton or is a moiety which can be transformed into a proton under use conditions;

$M^{+s}$ is a cationic species having or positing charge s;

s is an integer equal to or greater than 1, preferably from 1 to about 8;

$R_4$ and $R_6$ are organic radicals or amino, and r is an integer equal to or greater than 1, preferably from 1 to about 100;

More preferred for use in the practice of this invention as dopants are acids or acid derivatives of the formula:

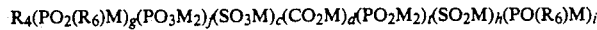

or

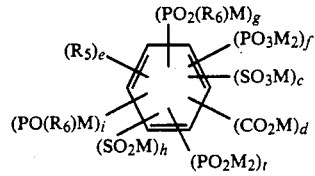

wherein:

M is $H^+$, or other metal or non-metal cation with the proviso that at least one of M is $H^+$ or a moiety which can be thermally or chemically transformed into a proton under use conditions, such as $^+NH_4$, $^+N(CH_3)_2H_2$, $Ph_3S^+$, $^+N(C_2H_5)H_3$ and the like t is 0, 1, 2, 3 or 4;
h is 0, 1, 2, 3 or 4;
i is 0, 1, 2, 3 or 4;
c is 0, 1, 2, 3 or 4;
d is 0, 1, 2, 3 or 4;
f is 0, 1, 2, 3 or 4;
g is 0, 1, 2, 3 or 4, with the proviso that at least one of c, d, f, g, h, i or t is other than 0;

$R_6$ is alkyl, aryl, aryloxy or alkoxy.

e is 0, 1 or 2; and $R_4$ and $R_5$ are the same or different at each occurrence and are nitro, cyano, hydroxy, halo, amino, alkylamino, dialkylamino, arylanino, diarylanino, alkylarylamino, or, substituted or unsubstituted alkoxy or aryl alkyl having from 1 to about 30 carbon atoms wherein permissible substituents include sulfonate salt, perhaloalkyl, phenyl, alkoxy, halo, cyano, amino, haloalkyl, hydroxy, sulfonic acid, phosphoric acid, phosphate salt, boric acid, sulfinate salt, phosphinate salt, sulfinic acid, borate salt, phosphinic acid, phosphonate salt, phosphonic acid, carboxylic acid, nitro, carboxylate salt, and the like, or any $R_6$ and $R_4$, or any two $R_5$, or any two $R_6$ substituents together may form an alkylene or alkenylene chain completing a ring system which chain may be unsubstituted or substituted with one or more halo, phosphoric acid, hydroxy, boric acid, nitro, cyano, amino, sulfinate salt, phosphinic acid, alkylamino, dialkylamino, phosphinate salt, arylamino, diarylazino, alkylarylamino, sulfinic acid, phosphate salt, carboxylate salt, phosphonic acid, phosphonate salt, sulfonate salt, borate salt, sulfonic acid or carboxylic acid groups, or $R_4$, $R_5$ or $R_6$ is a moiety of the formula:

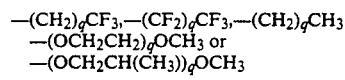

wherein: q is a positive whole number from 1 to about 10.

In the particularly preferred embodiment of this invention, useful dopants are acids and/or acid derivatives of the above formula:

or

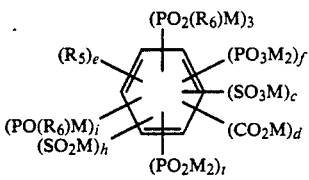

wherein:
c is 0, 1, 2 or 3;
d, t, f, g, h and i are the same or different at each occurrence and are 0, 1, 2 or 3 with the proviso that at least one of c, d, t, f or g, i or h is other than 0;
e is 0, 1 or 2;
$R_6$ is alkyl, alkoxy, aryloxy or aryl;
$R_4$ and $R_5$ are the same or different are hydroxy, amino, alkylamino, dialkylamino, arylamino, diarylamino, alkyl aryl amino, substituted or unsubstituted phenyl or alkyl, wherein permissible substituents are selected from the group consisting of alkyl, hydroxy, amino, alkylamino, dialkylamine, arylamine, diarylamino, alkylarylazino, hydroxy, phenyl, haloalkyl, perhaloalkyl, cyano, amino, nitro, alkoxy, boric acid, borate salts, phosphonate, phosphonic acid, carboxylate salts, sulfonate salts, phosphate salts, phosphinic acid, phosphinate salt, sulfonic acid, carboxylic acid, phosphoric acid, sulfinic acid or sulfinate salts or any or any two $R'_5$, substituents together may form an unsubstituted or substituted alkylene or alkenylene chain completing a naphthalene, anthracene or phenanthrene fused ring system wherein permissible substituents are as described above or $R_4$ or $R_5$ or $Re_6$ is a moiety of the formula:

$$-(CH_2)_qCF_3, -(CF_2)_qCR_3, -(CH_2)_qCH_3,$$
$$-(OCH_2CH_2)_qOCH_3 \text{ or}$$
$$-(OCH_2CH(CH_3))_qOCH_3$$

wherein:
q is a positive whole number from 1 to about 10; and
M is $H^+$, or other metal or non-metal cation, with the proviso that at least one of M is $H^+$ or a moiety which can be thermally or chemically transformed into a proton under use conditions.

In the most preferred embodiments of this invention, useful dopants are acids and/or acid derivatives of the formula:

$$R_4(PO_2(R_6)M)_g(PO_3M_2)_f(SO_3M)_c(CO_2M)_d$$
or

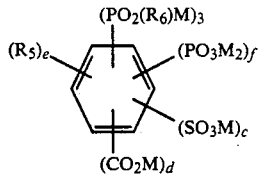

wherein:
c, d, e, f and g are the same or different and are 0, 1 or 2, with the proviso that at least one of c, d, f and g is not 0;
$R_4$ and $R_5$ are the same or different at each occurrence and are alkyl, phenyl, amino, alkylamino, dialkylamino, arylanino, diarylamino, alkylarylazino, or alkyl substituted with one or more fluoro, sulfonic acid, sulfonate salt, alkoxy, carboxylate salt, hydroxy, nitro, cyano, phosphinic acid, phosphonic acid phosphinate salt, phosphonate salt, amino or carboxylic acid groups, or phenyl substituted with one or more perfluoroalkyl, alkyl, alkoxy, fluoroalkyl, sulfonic acid, phosphinic acid, phosphonic acid, phosphinate salt, phosphonate salt, sulfonate salt, carboxylate, hydroxy, nitro, cyano, or carboxylic acid groups or any or two $R_5$, substituents together may form an alkenylene chain completing a naphthalene, anthracene or phenanthrene fused system which may be substituted with one or more alkyl, alkoxy, fluoro, perfluoroalkyl, phosphinic acid, phosphinate salt, phosphonic acid, phosphonate salt, fluoroalkyl, sulfonic acid, sulfonate salt, carboxylic acid, carboxylate salt, hydroxy, nitro, amino or cyano groups;
$R_6$ is aryl, aryloxy, alkyl or alkoxy; and
M is $H^+$ or other metal or non-metal cation, with the proviso that at least one of M is $H^+$ or is a moiety which can be thermally transformed into a proton under process conditions.

In the especially preferred embodiments of this invention, useful dopants are acids or acid derivatives of the formula:

$$R_4(SO_3M)_c(CO_2M)_d$$

or

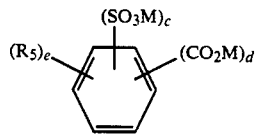

wherein:
c is 1, 2 or 3;
d is 1, 2 or 3 with the proviso that at least one of c, d is not 0
e is 0, 1 or 2;
$R_4$ and $R_5$ are th same or different at each occurrence and are hydroxy, dialkylamino, diarylamino, perfluoroalkyl, alkylarylamino, amino, alkylamino, arylamino, alkyl, phenyl, alkyl substituted with one or more fluoro, sulfonic acid, sulfonate salt, alkoxy, dialkylamino, diarylamino, alkylarylamino, carboxylate salt, hydroxy, alkylamino, arylamino, phosphonic acid, nitro, cyano, phosphinic acid, phosphinate salt, phosphonate amino or carboxylic acid groups, or phenyl substituted with one or more alkyl, alkoxy, fluoroalkyl, dialkylamino, diarylazino, alkylarylamino, sulfonic acid, alkylamino, arylamino, sulfonate salt, carboxylate salt, hydroxy, phosphinate acid, phosphinate salt, nitro, cyano, amino or carboxylic groups or any two $R_4$ and $R_5$ substituents together may form an alkylene or alkenylene chain completing a naphthalene, anthracene or phenanthrene fused system which may be substituted with one or more alkyl, alkoxy, fluoro, fluoroalkyl, sulfonic acid, sulfonate salt, carboxylic acid, phosphinic acid, phosphinate salts, carboxylate salt, hydroxy, nitro, amino, alkylanino, dialkylamino, arylamino, diarylamino, alkylarylanino, or cyano groups;

M is H+ or other metal or non-metal cation or a moiety which can be thermally tranformed into a proton under process conditions.

In the process of the embodiment of this invention of choice, the dopant is a sulfonic acid or sulfonic acid derivative of the formula:

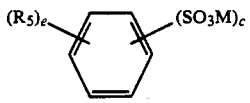

wherein;
c is 1, 2 or 3;
e is 0, 1 or 2;
$R_5$ is alkyl or alkyl substituted with one or more fluoro groups, or any two $R_5$ groups together may form an alkenylene chain completing a naphthalene fused ring system which may be substituted with one or more sulfonic acid, sulfonic salt group or a combination thereof; and M is a proton, or other metal or non-metal cation, with the proviso that at least one of M is proton.

The following is a listing of dopants which are useful in the practice of the most preferred embodiments of this invention for formation of the dopant solute.
1-anthracene sulfonic acid,
9-anthracene sulfonic acid,
2-phenanthrene sulfonic acid,
3-phenanthrene sulfonic acid,
9-phenanthrene sulfonic acid,
$NO_2CF_3SO_3$,
$CF_3SO_3H$,
perflourooctyl sulfonic acid
perfluorooctyl carboxylic acid
octyl sulfonic acid,
dodecyl sulfonic acid,
cetyl sulfonic acid,
toluene sulfonic acid (TsOH),
$Fe(OTs)_3$,
$Fe(CH_3SO_3)_3$,
$(FSO_3)_2$,
AgOTs,
$Me_3SiOTs$,
dodecylbenzene sulfonic acid,
naphthalene sulfonic acid,
benzene disulfonic acid,
benzene sulfonic acid,
1,3-benzene disulfonic acid,
2,5-dihydroxy-1,4-benzene disulfonic acid,
camphor sulfinic acid
naphthalene trisulfonic acid
dodecylbenzene sulfonic acid,
ethane sulfonic acid
1,5-naphthalene disulfonic acid,
nickel phthalocyanine tetrasulfonic acid,
phenyl phosphonic acid,
diphenyl phosphinic acid
phenyl phosphinic acid,
3-sulfopropyl acrylate,
3-sulfopropyl methacrylate,
sulfamic acid,
5-sulfosalicyclic acid,
trion (4,5-dihydroxy-1,3-benzene disulfonic acid),
vinyl sulfonic acid,
sulfanilic acid,
4-sulfophthalic acid,
sulfoacetic acid,
methyl phosphinic acid,
phenylphosphonic acid,
methyl phosphonic acid,
methyl orange,
sulfonated polystyrene,
sulfonated poly(2-vinyl naphthalene),
naphthol yellow,
naphthol blue black,
1,2-naphthoquinone-4-sulfonic acid,
naphthylazoxine S,
1-octane sulfonic acid,
t-butyl phosphonic acid,
ethyl phosphonic acid,
butyl phosphonic acid,
1,2-benzene disulfonic acid,
4-octylbenzene sulfonic acid,
2-mesitylene sulfonic acid,
2,6-naphthalene disulfonic acid,
2-naphthalene sulfonic acid,
1,3,6-naphthalene trisulfonic acid,
1,3,7-naphthalene trisulfonic acid,
sulfonazo III acid,
biphenyl disulfonic acid,
biphenyl sulfonic acid,
1,8-dihydroxynaphthalene-3-6-disulfonic acid,
3,6-dihydroxynaphthalene-2,7-disulfonic acid,
4,5-dihydroxynaphthalene-2,7-disulfonic acid,
6,7-dihydroxy-2-naphthalene sulfonic acid,
1-naphthalene phosphoric acid,
1-naphthalene sulfonic acid,
1-naphthalene-5,7-dinitro-8-hydroxy,
1-naphthalene-4-hydroxy sulfonic acid,
4-bromo benzene sulfonic acid,
4-hydroxy-5-isopropyl-2-methyl benzene sulfonic acid
3,4-diamino benzene sulfonic acid
benzenephosphoric acid,
1,3,5-benzene trisulfonic acid,
2-methyl-5-isopropyl benzene sulfonic acid,
3,4-dinitro benzene sulfonic acid,
2-methoxy benzene sulfonic acid,
1-naphthalene-5-hydroxy sulfonic acid,
1-naphthalene-7-hydroxy sulfonic acid,
1-naphthalene-3-hydroxy sulfonic acid,
2-napthalene-1-hydroxy sulfonic acid,
4-phenylamino benzene sulfonic acid,
1,6-naphthalene disulfonic acid,
1,5-naphthalene disulfonic acid,
1,3-naphthalene-7-hydroxy disulfonic acid, and
$Me_3SiOSO_2CF_3$.

The amount of dopant added to the conjugated backbone homopolymer or copolymer coating the particle is not critical and may vary widely. In general, sufficient dopant is added to the homopolymer or copolymer to at least form doped polymer which is a semi-conductor which has a conductivity of at least about $10^{-12}$ $ohm^{-1}cm^{-1}$. The upper level of conductivity is not critical and will usually depend on the type of homopolymer or copolymer employed. In general, the highest level of conductivity obtained is provided without unduly adversely affecting the environmental stability of the conjugated backbone homopolymer or copolymer. In the preferred embodiments of the invention the amount of dopant employed is sufficient to provide a conductivity of at least about $10^{-9} ohm^{-1}cm^{-1}$ and in the particularly preferred embodiments is sufficient to provide a conductivity of from about $10^{-2}\text{ohm}^{-1}\text{cm}^{-1}$ to about $10^{+2}\text{ohm}^{-1}\text{cm}^{-1}$. Amongst these particularly preferred embodiments, most preferred are those embodiments in which an unsubstituted polymer is polyaniline and in which sufficient dopant is employed to provide a conductivity of at least about $10^{-1}\text{ohm}^{-1}\text{cm}^{-1}$ to about $10^{+2}\text{ohm}^{-1}\text{cm}^{-1}$, with amounts sufficient to provide a conductivity from about $10^{0}\text{ohm}^{-1}\text{cm}^{-1}$ to about $10^{+2}\text{ohm}^{-1}\text{cm}^{-1}$ usually being the amounts of choice.

The blend prepared by the process of this invention can be used for any purpose for which polymer blends are useful. For example, where such blends are electrically conductive, they can be used in the fabrication of articles which comprise electrically conductive portions, and electrically non-conductive portions and articles which are completely electrically conductive. Examples of such articles include electrically conductive polymer housings for EMI Shielding of sensitive electronic equipment such as microprocessors; infrared, radio frequency and microwave absorbing shields; flexible electrical conducting connectors; conductive bearings and brushes; semiconducting photoconductor junctions; electrodes; capacitors; optically transparent or non-transparent corrosion-preventing coatings for corrodible materials such as steel; antistatic materials and optically transparent or non-transparent coatings for packaging electronic components; carpet fibers; waxes for floors in computer rooms; antistatic finishes for CRT screens, aircraft, and auto windows, and the like.

Various other applications are anticipated for the conducting coatings produced by the present processes, such as in conducting plastic gas tanks; solar window coatings; transparent electrical elements for heated windows and heated liquid crystal displays; electrochromic displays, electrical contacts for electroluminescent displays and elecroluminescent lights, and electrical contacts for piezoelectric films for transparent loud speakers; transparent conducting coatings for windows in burglar alarm systems; membrane coatings for chemical separations (such as $O_2$ and $N_2$, for example), and conducting coatings for membrane switches, and a discharge layer or photoresist layer for lithographic process.

The following specific examples are presented to more particularly illustrate the invention, and should not be construed as being limitations on the scope and spirit of the invention.

EXAMPLE I

Nylon particles with a size of 35 mesh ( i.e. 0.43 mm ) were embedded with N-phenyl-1,4-phenylene diamine as an initiator by the following procedure.

The nylon particles (200 g) were suspended and stirred in 500 mL methanol containing 4 g of N-phenyl-1,4-phenylene diamine for 1 hour. After filtration and then rinse with 150 mL of methanol, purple-brown nylon particles embedded with the initiator were obtained.

EXAMPLE II

The initiator-embedded nylon particles prepared in Example I were air-dried overnight and then suspended in a 1 L aqueous solution containing 23.2 g aniline and 95.1 g p-toluene sulfonic acid. Into this solution, 30 mL of 30 wt % hydrogen peroxide solution was added and stirred for 25 minutes. The purple-brown nylon particles turned to blue within a few minutes and then to light green; while the reaction solution stayed in colorless without forming any polyaniline particles in the solution. After 25 minutes the addition of hydrogen peroxide, 0.2 mL of ammonium peroxydisulfate solution (prepared by dissolving 157 g of ammonium peroxydisulfate in 270 mL deionized water ) was added. The nylon particles turned more green with time; while the reaction solution was still free of any polyaniline particles. One hour after the addition of hydrogen peroxide, another 0.2 mL ammonium peroxydisulfate solution was added. The resulting solution was stirred for one more hour. The solid was then collected by filtration and rinsed with 300 mL of deionized water. The obtained green particles were air-dried for 3 days and then heat-dried at 80° C. under dynamic vacuum for 4 hours.

This obtained green particles were examined by microscope with a magnification power of 30-fold. The results indicated that only large individually separated particles with green translucence having a size similiar to the original nylon particles ( 0.43 mm) were observed (cf. the polyaniline particle normally has a much smaller size, about 0.001-0.01 mm which is dark green without translucent and tends to aggregate ). This result indicated that the product contained only polyaniline coated nylon particles.

The conductivity of a pressed pellet of 1 cm diameter was measured by a 4-in-line probe as $1.6 \times 10^{-4}$ S/cm.

EXAMPLE III

The polyaniline-coated nylon particles obtained in Example II were compressed in a square mold ( $2 \times 2$ inch ) at 240° C. for 2 minutes to give a blue translucent film having a thickness about 6 mil (i.e. 150 $\mu$m ). The obtained film was then soaked in a 20 wt % p-toluene sulfonic acid for 30 minutes to give a green translucent film. The surface resistance of the film was measured by a 4-in-line probe to be $9 \times 10^7$ ohm/sq.

Other thinner films having similar surface resistivities were prepared by pressing the polyaniline-coated nylon particles between two metal plates at about 10 ton pressure to give a light green transparent film having a thickness of about 1 to 2 mil (i.e. 25 to 50 $\mu$m).

What is claimed is:

1. A process for forming a blend comprising one or more conjugated backbone homopolymers of copolymers and one or more non-conductive homopolymers of copolymers which comprises:
   a) coating all or part of the surface of particles comprising one or more non-conductive homopolymers or copolymers with one or more conjugated backbone homopolymers or copolymers to form coated particles; and
   b) processing a plurality of said coated particles into a polymer blend comprising said conjugated backbone homopolymers or copolymers dispersed in a continuous phase comprising said non-conductive homopolymers or copolymers.

2. A process according to claim 1 wherein at least one of said conjugated backbone homopolymers or copolymers coating said particles are doped and are electrically conductive and wherein said blend has an electrical conductivity equal to or greater than about $10^{-12}\text{ohm}^{-1}\text{cm}^{-1}$.

3. A process according to claim 1 wherein said conjugated backbone homopolymers or copolymers are not doped to the electrically conductive states.

4. A process according to claim 1 wherein coating comprises the steps of:
  (a) contacting particles of said non-conductive homopolymers or copolymers with a solution comprising said conjugated backbone homopolymers or copolymers and a solvent;
  (b) removing said particles from contact with said solution to form particles having a residue of said solution on all or a portion of the surface thereof; and
  (c) removing the solvent from said residue to form particles having a coating of said conjugated backbone homopolymers or copolymers on all or a portion of the surface thereof.

5. A process according to claim 1 wherein said coating comprises polymerizing said conjugated backbone homopolymers or copolymers onto all or a portion of a particle comprising said non-conductive homopolymers or copolymers.

6. A process according to claim 5 wherein said polymerizing comprises the steps of:
  (a) contacting particles of said non-conductive homopolymers or copolymers with one or more initiating agents capable of being absorbed, adsorbed or absorbed and adsorbed on, in, or on and in all or a portion of the surface of said particle, at least one of said initiating agents having an oxidation potential less than that of one or more monomers of said conjugated backbone homopolymers of copolymers, and when oxidized being capable of reacting with and coupling to one or more of said monomers to initiate the polymerization of said monomers to form said conjugated backbone homopolymers or copolymers on all or a portion of the surface of said particles; and
  (b) contacting said particles having said adsorbed, adsorbed, or adsorbed and absorbed initiating agents with a solution comprising one or more solvents, and one or more monomers having an oxidation potential greater than that of said initiating agents, in the presence of an oxidizing agent having an oxidation potential greater than the oxidation potential of said initiating agents, such that said oxidizing agents are capable of oxidizing said initiating agents to promote polymerization of said nonomers by coupling to said initiating agents to form a coating of conjugated backbone homopolymers or copolymers on all or a portion of the surface of said particle.

7. A process according to claim 1 wherein said monomer is a substituted or unsubstituted aniline and said conjugated homopolymer or copolymer is a polyaniline.

8. A process according to claim 7 wherein said polyaniline is of the type derived from polymerizing an aniline of the Formula XV:

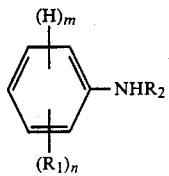

(XV)

or is a derivative of polyaniline of the type derived from polymerizating said aniline wherein:
n is an integer from 0 to 5;
m is an integer from 0 to 5, with the proviso that the sum of n and m is 5;

$R_1$ is phosphinic acid, phosphonic acid, sulfonic acid, boric acid, phosphoric acid, alkylamino, dialkylazino, arylamino, diarylamino, alkylarylamino, amino, sulfonate salt, borate salt, hydroxy, phosphonate salt, phosphinate salt, phosphate salt, sulfinic acid, nitro, sulfinate salt, carboxylic acid, halo, carboxylate salt, cyano, deuterium, or substituted or unsubstituted alkyl, alkenyl, alkoxy, cycloalkyl, cycloalkenyl, alkanoyl, alkylthio, alkynyl, dialkylamino, arylamino, diarylamino, alkylarylamino, aryloxy, hydroxy, alkylthioalkyl, alkylaryl, arylalkyl, aryloxy, amino, alkylthioalkyl, alkylaryl, arylalkyl, alkylsufinyl, alkoxyalkyl, alkylsulfonyl, aryl, arylthio, arylsulfinyl, alkoxycarbonyl, alkylsilane, or arylsulfonyl, wherein permissible substituents are one or more amino, phosphinate salt, alkylamino, dialkylamino, arylamino, diarylamino,phosphinic acid, alkylarylamino, phosphonic acid, sulfonic acid, boric acid, sulfinic acid, sulfinate salt, phosphoric acid, sulfonate salt, borate salt, carboxylate salt, phosphonate salt, phosphate salt, carboxylic acid, halo, nitro, hydroxy, cyano or epoxy moieties; or any two $R_1$ substituents or any one R, substituent and $R_2$ substituent taken together may form substituted or unsubstitued alkylene, alkynylene or alkenylene chain completing a 3, 4, 5, 6, 7, 8, 9 or 10 membered aromatic, heteroalicyclic, heteroaromatic or alicyclic carbon ring, which ring may optionally include one or more divalent ester, carbonyl, nitrogen, sulfur, sulfinyl, sulfonyl or oxygen, wherein permissible substituents are one or more amino, alkylamino, phosphinic acid, phosphinate salt, dialkylamino, arylamino, diarylamino, alkylarylamino, phosphonic acid, sulfonic acid, boric acid, sulfinic acid, sulfinate salt, phosphoric acid, sulfonate salt, borate salt, carboxylate salt, phosphonate salt, phosphate salt, carboxylic acid, halo, nitro, hydroxy, cyano or epoxy moieties, or $R_3$ is an aliphatic moiety having repeat units of the formula:

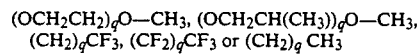

wherein
q is a positive whole number; and
$R_2$ is the same or different at each occurrence and is $R_1$ substituents or hydrogen.

9. A process according to claim 7 wherein the polyaniline comprises repeat units of the Formulas XVI and XVII:

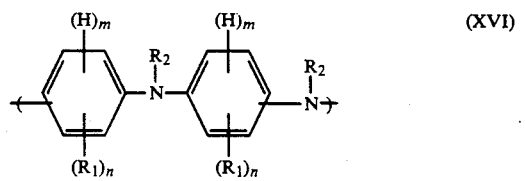

(XVI)

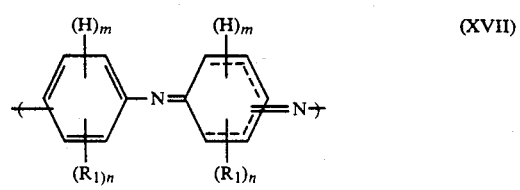

(XVII)

or a combination thereof, wherein:
R₁ is phosphinic acid, phosphonic acid, sulfonic acid, boric acid, phosphoric acid, alkylamino, dialkylamino, arylamino, diarylamino, alkylarylamino, amino, sulfonate salt, borate salt, hydroxy, phosphonate salt, phosphinate salt, phosphate salt, sulfinic acid, nitro, sulfinate salt, carboxylic acid, halo, carboxylate salt, cyano, deuterium, or substituted or unsubstituted alkyl, alkenyl, alkoxy, cycloalkyl, cycloalkenyl, alkanoyl, alkylthio, alkynyl, dialkylamino, arylamino, diarylamino, alkylarylamino, aryloxy, hydroxy, alkylthioalkyl, alkylaryl, arylalkyl, aryloxy, amino, alkylthioalkyl, alkylaryl, arylalkyl, alkylsufinyl, alkoxyalkyl, alkylsulfonyl, aryl, arylthio, arylsulfinyl, alkoxycarbonyl, alkylsilane, or arylsulfonyl, wherein permissible substituents are one or more amino, phosphinate salt, alkylamino, dialkylamino, arylamino, diarylamino,phosphinic acid, alkylarylamino, phosphonic acid, sulfonic acid, boric acid, sulfinic acid, sulfinate salt, phosphoric acid, sulfonate salt, borate salt, carboxylate salt, phosphonate salt, phosphate salt, carboxylic acid, halo, nitro, hydroxy, cyano or epoxy moieties; or any two R₁ substituents or any one R₁ substituent and R₂ substituent taken together may form substituted or unsubstitued alkylene, alkynylene or alkenylene chain completing a 3, 4, 5, 6, 7, 8, 9 or 10 membered aromatic, heteroalicyclic, heteroaromatic or alicyclic carbon ring, which ring may optionally include one or more divalent ester, carbonyl, nitrogen, sulfur, sulfinyl, sulfonyl or oxygen, wherein permissible substituents are one or more amino, alkylamino, phosphinic acid, phosphinate salt, dialkylamino, arylamino, diarylamino, alkylarylamino, phosphonic acid, sulfonic acid, boric acid, sulfinic acid, sulfinate salt, phosphoric acid, sulfonate salt, borate salt, carboxylate salt, phosphonate salt, phosphate salt, carboxylic acid, halo, nitro, hydroxy, cyano or epoxy moieties, or R₃ is an aliphatic moiety having repeat units of the formula:

$(OCH_2CH)_qO{-}CH_3$, $(OCH_2CH(CH_3))_qO{-}CH_3$, $(CH_2)_qCF_3$, $(CF_2)_qCF_3$ or $(CH_2)_q CH_3$ wherein:
q is a positive whole number; and
R₂ is the same or different at each occurrence and is R₁ substituents or hydrogen.

10. A process according to claim 8 wherein said homopolymer or copolymer is comprised of the Formulas XVII to XXI:

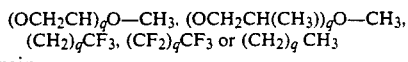 XVIII

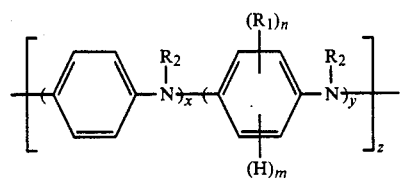 XIX

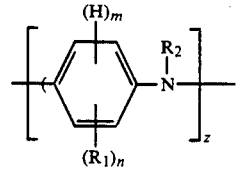 XX

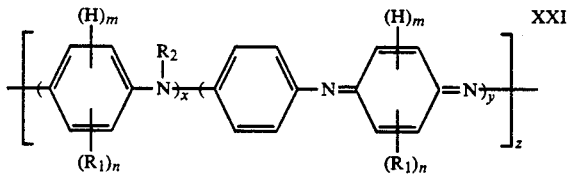 XXI

Wherein:
x and y are the same or different at each occurrence and are integers equal to or greater than 0, with the proviso that the sum or x and y are greater than 0;
z is an integer equal to or greater than about 1;
n is an integer from 0 to 3;
m is an integer from 1 to 4, with the proviso that the sum of n and m is 4;
R₁ is the same or different at each occurrence and is alkyl, alkenyl, alkoxy, cycloalkyl, cycloalkenyl, alkanoyl, amino, alkylamino, dialkylamino, arylamino, diarylamino, alkylarylamino, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, phosphinic acid, phosphonic acid, alkylsilyl, boric acid, arylsulfonyl, carboxylic acid, halo, hydroxy, phosphate salt, sulfonate salt, phosphonate salt, borate salt, phosphinate salt, carboxylate salt, nitro, cyano, sulfonic acid, phosphoric acid or aryloy, alkyl or alkoxy substituted with one or more sulfonic acid, carboxylic acid, sulfinate salt, phosphoric acid, boric acid, sulfinic acid, halogen, nitro, cyano, epoxy, hydroxy, sulfonate salt, phosphate salt, phosphonate salt, phosphinic acid, phosphinate salt, carboxylate salt, phosphonic acid or borate salt substituents; or any two R₁ groups or any one R₁ group and R₂ group together may form a substituted or unsubstituted alkylene or alkenylene chain completing a 3, 4, 5, 6, 7, 8, 9 or 10 membered heteroaromatic, heteroalicyclic, aromatic or alicyclic carbon ring, which chain may optionally include one or more divalent nitrogen, ester, carbonyl, sulfur, sulfinyl, sulfonyl or oxygen group, wherein permissible substituents are one or more sulfonic acid, carboxylic acid, sulfinate salt, phosphoric acid, boric acid, sulfinic acid, halogen, nitro, cyano, epoxy, hydroxy, sulfonate salt, phosphate salt, phosphonate salts, phosphinic acid, phosphinate salt, carboxylate salts, phosphonic acid or borate salt substituents; and
R₂ is the same of different at each occurrence and is R₁ substituents or hydrogen 11. A process according to claim 10 wherein m is from about 2 to about 4.

12. A process according to claim 11 wherein m is from about 3 to about 4.

13. A process according to claim 10 wherein said polyaniline is derived from substituted anilines.

14. A process according to claim 10 wherein said polyaniline is derived from unsubstituted aniline.

15. A process according to claim 13 wherein $R_1$ is the same or different at each occurrence and is alkyl or alkoxy having from 1 to about 30 carbon atoms.

16. A process according to claim 15 wherein $R_1$ is the same or different at each occurrence and is alkyl having from 1 to about 10 carbon atoms or alkoxy having from 1 to about 20 carbons.

17. A process according to claim 13 wherein $R_1$ is alkyl or substituted alkyl.

18. The process according to claim 10, wherein: n is an integer from 0 to 1;
m is an integer from 3 to 4, with the proviso that the sum of n and m is equal to 4;
$R_1$ is aryl, alkyl or alkoxy having from 1 to about 20 carbon atoms, sulfonic acid, halo, carboxylic acid, amino, carboxylate salt, alkylamino, phosphonate salt, dialkylamino, arylamino, phosphonic acid, boric acid, phosphate salt, phosphoric acid, borate salt, diarylanino, alkylyarylamino, or alkyl or aryl substituted with carboxylic acid, phosphoric acid, boric acid, phosphate salt, phosphonic acid, borate salt, sulfonate salt, amino, alkylamino, dialkylamino, arylamino, diarylamino, alkylarylamino, carboxylate salt, halo, phosphonate salt, or sulfonic acid substituents;
$R_2$ is the same or different at each occurrence and is a $R_1$ subsituent or hydrogen;
x is an integer equal to or greater than 2;
y is equal to or greater than 0; and
z is an integer equal to or greater than about 5.

19. A process according to claim 18 wherein:
n is an integer from 0 to 1;
m is an integer from 3 to 4, with the proviso that the sum of n and m is equal to 4;
$R_1$ is aryl, alkyl, alkoxy, amino, alkylazino, dialkylamino, arylamino, diarylamino, alkylarylamino, halo, sulfonic acid, sulfonate salt, carboxylic acid or carboxylate salt or alkyl or aryl substituted with one or more sulfonic acid, carboxylate salt, amino, alkylamino, dialkylamino, arylamino, diarylanino, halo, alkylarylamino, sulfate salt, sulfonate salt, or carboxylic acid substituents, wherein aromatic moieties include from 6 to about 21 carbon atoms and the aliphatic moieties are from 1 to about 15 carbon atoms;
$R_2$ is hydrogen;
x is an integer equal to or greater than 1 with the proviso that the ratio of x to y is equal to or greater than 1;
y is equal to or greater than 1, with the proviso that the ratio of x to y is equal to or greater than about 2; and
z is an integer equal to or greater than about 5.

20. A process according to claim 19 wherein:
n is 0 or 1;
m is 3 or 4, with the proviso that the sum of n and m is 4;
$R_1$ is sulfonic acid, a hydrolyzable derivative of sulfonic acid, or a derivative of sulfonic acid which can be chemically or thermally converted to sulfonic acid, alkoxy or alkyl; and
$R_2$ is hydrogen.

21. A process according to claim 20 wherein:
n is 1;
m is 3;
$R_1$ is sulfonic acid or a hydrolyzable derivative thereof, or a combination of sulfonic acid derivatives, which can chemically or thermally be converted to sulfonic acid; and
$R_2$ is hydrogen.

22. A process according to claim 20 wherein:
n is 0;
m is 4; and
$R_2$ is hydrogen.

23. A process according to claim 21 wherein $R_1$ is sulfonic acid or a salt thereof.

24. A process according to claim 23 wherein $R_1$ is sulfonic acid.

25. A process according to claim 1 wherein said conjugated copolymer or homopolymer is electrically non-conductive copolymer or homopolymer, which process further comprises doping said polymer in said coating to form electrically conductive particles prior to said molding.

26. A process according to claim 1 wherein said conjugated backbone polymer is electrically non-conductive, which process further comprises doping said polymer in said blend to form an electrically conductive blend.

27. A process of claim 26 wherein said polymer is doped by an organic or inorganic acid having a pKa less than that of said polymer.

28. The process of claim 27 wherein said polymer is a substituted or unsubstituted polyaniline.

29. A process according to claim 28 wherein said polyaniline is doped with one or more organic acid dopants or salts thereof having anionic moieties of the formula:

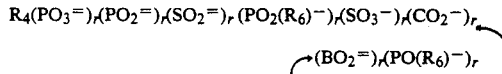

and having a cationic moiety of the formula:

$$M^{+s}$$

wherein at least one of the cation moieties of the formula $M^{+s}$ is a proton or is a moiety which can be transformed into a proton under use conditions;
$M^{+s}$ is a cationic species having or positive charge s;
s is an integer equal to or greater than 1;
$R_4$ and $R_6$ are organic radicals or amino, and
r is an integer equal to or greater than 1.

30. A process according to claim 29 wherein said dopants are acids or acid derivatives of the formula:

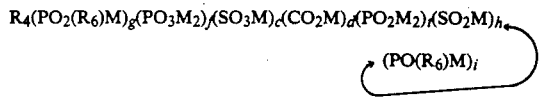

or

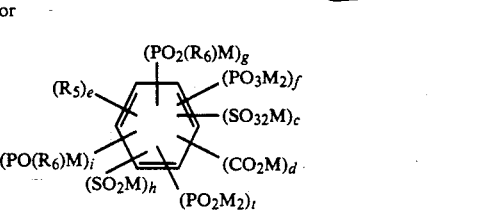

wherein:
M is $H^+$, or other metal or non-metal cation with the proviso that at least one of M is $H^+$ or a moiety which can be thermally or chemically transformed into a proton under use conditions, such as t is 0, 1, 2, 3 or 4;
i is 0, 1, 2, 3 or 4;
h is 0; 1, 2, 3 or 4;
c is 0, 1, 2, 3 or 4;
d is 0; 1, 2, 3 or 4;
f is 0; 1, 2, 3 or 4;
g is 0, 1, 2, 3 or 4 with the proviso that at least one of t, i, h, c, d, f or g is other than 0;
e is 0, 1 or 2; and
$R_4$, $R_5$ and $R_6$ are the same or different at each occurrence and are nitro, cyano, hydroxy, halo, amino, alkylamino, dialkylamino, arylamino, diarylamino, alkylarylamino, alkoxy, or substituted or unsubstituted alkoxy, aryl or alkyl having from 1 to about 30 carbon atoms wherein permissible substituents include sulfonate salt, perhaloalkyl, phenyl, alkoxy, halo, cyano, amino, haloalkyl, hydroxy, sulfonic acid, phosphoric acid, phosphate salt, boric acid, sulfinate salt, phosphinate salt, sulfinic acid, borate salt, phosphinic acid, phosphonate salt, phosphonic acid, carboxylic acid, nitro, carboxylate salt and the like, or any two $R_5$, or any two $R_6$, or any $R_4$ and $R_6$ substituents together may form an alkenylene chain completing a fused-ring system which chain may be unsubstituted or substituted with one or more halo, phosphoric acid, hydroxy, boric acid, nitro, cyano, amino, sulfinate salt, phosphinic acid, alkylamino, dialkylamino, phosphinate salt, arylamino, diarylamino, alkylarylamino, sulfinic acid, phosphate salt, carboxylate salt, phosphonic acid, phosphonate salt, sulfonate salt, borate salt, sulfonic acid or carboxylic acid groups, or $R_4$ or $R_5$ or $R_6$ is a moiety of the formula:

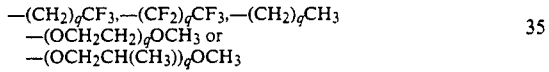

wherein:
q is a positive whole number from 1 to about 10.

31. A process according to claim 30 wherein said dopants are acids, acid derivatives or a combination thereof of the above formula:

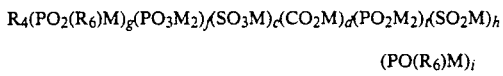

or

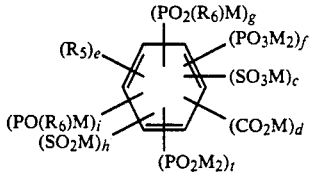

wherein:
c is 0, 1, 2 or 3;
d, t, i, f, g and h are the same or different at each occurrence and are 0, 1, 2, 3, with the proviso that at least one of c, h, i, t, d, f or g is other than 0;
e is 0, 1 or 2;
$R_4$ and $R_5$ are the same or different and are hydroxy, amino, alkylamino, dialkylamino, arylamino, diarylamino, alkyl aryl amino, substituted or unsubstituted phenyl or alkyl wherein permissible substituents are selected from the group consisting of alkyl, hydroxy, amino, alkylamino, dialkylamine, arylamine, diarylamino, alkylarylamino, hydroxy, phenyl, haloalkyl, perhaloalkyl, cyano, amino, nitro, alkoxy, boric acid, borate salts, phosphonate, phosphonic acid, carboxylate salts, sulfonate salts, phosphate salts, phosphinic acid, phosphinate salt, sulfonic acid, carboxylic acid, phosphoric acid, sulfinic acid or sulfinate salts or any two $R_6$ substituents together may form an unsubstituted or substituted or alkenylene chain completing a naphthalene, anthracene or phenanthrene fused ring system wherein permissible substituents are as described above or $R_4$ or $R_5$ is a moiety of the formula:

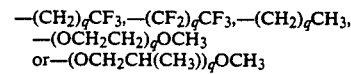

wherein:
q is a positive whole number from 1 to about 10;
$R_6$ is alkyl, alkoxy, aryloxy or aryl; and
M is H+, or other metal or non-metal cation, with the proviso that at least one of M is H+ or a moiety which can be thermally or chemically transformed into a proton under use conditions.

32. A process according to claim 31 wherein said dopants are acids and/or acid derivaties of the formula:

or

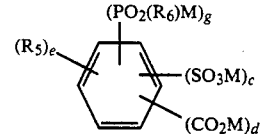

wherein:
c, d, e, and g are the same or different and are 0, 1 or 2 with the proviso that at least one of c, d, and g is not 0;
$R_4$ and $R_5$ are the same or different at each occurrence and are alkyl, phenyl, amino, alkylamino, dialkylamino, arylamino, diarylamino, alkylarylamino, or alkyl substituted with one or more fluoro, sulfonic acid, sulfonate salt, alkoxy, carboxylate salt, hydroxy, nitro, cyano, phosphinic acid, phosphinate salt, amino or carboxylic acid groups, or phenyl substituted with one or more alkyl, alkoxy, fluoroalkyl, sulfonic acid, phosphinic acid, phosphinic salt, sulfonate salt, carboxylate, hydroxy, nitro, cyano, or carboxylic acid groups or any two $R_6$ or two $R_5$, or any $R_6$ and $R_4$ substituents together may form an alkylene or alkenylene chain completing a naphthalene, anthracene or phenanthrene fused system which may be substituted with one or more alkyl, alkoxy, fluoro, phosphinic acid, phosphinate salt, fluoroalkyl, sulfonic acid, sulfonate salt, carboxylic acid, carboxylate salt, hydroxy, nitro, amino or cyano groups;
$R_6$ is aryl, aryloxy, alkyl or alkoxy; and
M is H+ or other metal or non-metal cation, with the proviso that at least one of M is H+ or is a moiety which can be thermally transformed into a proton under process conditions.

33. A process according to claim 32 wherein said dopants are acids, acid derivatives or a combination thereof of the formula:

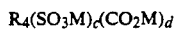

or

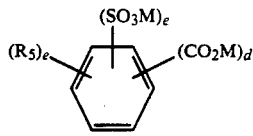

wherein:
c is 1, 2 or 3;
d is 0, 1 or 2, with the proviso that at least one of c, or d is not 0;
e is 0, 1 or 2;
$R_4$ and $R_5$ are th same or different at each occurrence and are hydroxy, dialkylamino, diarylazino, alkylarylamino, amino, alkylazino, arylamino, alkyl, phenyl, alkyl substituted with one or more fluoro, sulfonic acid, sulfonate salt, alkoxy, dialkylamino, diarylazino, alkylarylamino, carboxylate salt, hydroxy, alkylamino, arylamino, phosphonic acid, nitro, cyano, phosphinic acid, phosphinate salt, phosphonate amino or carboxylic acid groups, or phenyl substituted with one or more alkyl, alkoxy, fluoroalkyl, dialkylamino, diarylamino, alkylarylamino, sulfonic acid, alkylamino, arylanino, sulfonate salt, carboxylate salt, hydroxy, phosphinate acid, phosphinate salt, nitro, cyano, amino or carboxylic groups or any two $R_4$ and $R_5$ substituents together may form an alkylene or alkenylene chain completing a naphthalene, anthracene, or phenanthrene fused system which may be substituted with one or more alkyl, alkoxy, fluoro, fluoroalkyl, sulfonic acid, sulfonate salt, carboxylic acid, phosphinic acid, phosphinate salts, carboxylate salt, hydroxy, nitro, amino, alkylamino, dialkylazino, arylamino, diarylamino, alkylarylamino, or cyano groups; and M is $H^+$ or other metal or non-metal cation or a moiety which is thermally tranformed into a proton under process conditions.

34. A process according to claim 33 wherein said dopant is a sulfonic acid, a sulfonic acid derivative, or a combination thereof of the formula:

wherein;
c is 1, 2 or 3;
e is 0, 1 or 2;
$R_5$ is alkyl or alkyl substituted with one or more fluoro, or any two $R_5$ groups together may form an alkenylene chain completing a naphthalene fused system which may be substituted with one or more sulfonic acid or sulfonic acid salt group; and M is a proton, or other metal or non-metal cation, with the proviso that at least one of M is a proton.

* * * * *

UNITED STATES PATENT AND TRADEMARK OFFICE
CERTIFICATE OF CORRECTION

Page 1 of 3

PATENT NO. : 5,254,633

DATED : October 19, 1993

INVENTOR(S) : Chien-Chung Han and Ronald L. Elsenbaumer

It is certified that error appears in the above-identified patent and that said Letters Patent is hereby corrected as shown below:

Column 32, line 47, "of" should read --or--.

Column 32, line 49, "of" should read --or--.

Column 33, line 29, "of" should read --or--.

Column 33, line 37, "adsorbed" (first occurrence) should read --absorbed--.

Column 33, line 52, "homopolumer" should read --homopolymer--.

Column 34, lines 4-5, "dialkylazino" should read --dialkylamino--.

Column 34, line 15, "alkylsufinyl" should read --alkylsulfinyl--

Column 34, line 26, "R," should read --$R_1$--.

Column 34, line 28, "unsubstitued" should read --unsubstituted--.

Column 34, line 41, "$R_3$" should read --$R_1$--.

Column 35, line 14, "alkylsufinyl" should read --alkylsulfinyl--

Column 35, line 27, "unsubstitued" should read --unsubstituted--.

Column 35, line 41, "$R_3$" should read --$R_1$--.

Column 35, line 44, "$(OCH_2CH)_qO—CH_3$" should read --$(OCH_2CH_2)_qO—CH_3$--.

Column 35, line 50, "8" should read --9--.

Column 36, line 20, "or" should read --of--.

Column 36, line 37, "aryloy" should read --aryloyl--.

UNITED STATES PATENT AND TRADEMARK OFFICE
CERTIFICATE OF CORRECTION

PATENT NO. : 5,254,633

DATED : October 19, 1993

INVENTOR(S) : Chien-Chung Han and Ronald L. Elsenbaumer

It is certified that error appears in the above-identified patent and that said Letters Patent is hereby corrected as shown below:

Column 36, line 59, "of" should read --or--.

Column 37, line 19, "diarylanino" should read --diarylamino--.

Column 37, line 27, "subsituent" should read --substituent--.

Column 37, line 36, "alkylazino" should read --alkylamino--.

Column 38, line 4, "20" should read --19--.

Column 38, line 35 (formula), "$(SO_2^=)_r$" should read --$(SO_2^-)_r$--.

Column 38, line 44, "or positive charge s" should read --a positive charge equal to s--.

Column 38, line 58 (formula), "$(SO_{32}M)_c$" should read --$(SO_3M)_c$--.

Column 40, line 26, "derivaties" should read --derivatives--.

Column 40, line 30, formula should read --$R_4(PO_2(R_6)M)_g(SO_3M)_c(CO_2M)_d$--.

Column 41, line 19, "th" should read --the--.

Column 41, line 21, "diarylazino" should read --diarylamino--.

Column 41, line 22, "alkylazino" should read --alkylamino--.

Column 41, line 25, "diarylazino" should read --diarylamino--.

UNITED STATES PATENT AND TRADEMARK OFFICE
CERTIFICATE OF CORRECTION

PATENT NO. : 5,254,633
DATED : October 19, 1993
INVENTOR(S) : Chien-Chung Han, et. al.

It is certified that error appears in the above-indentified patent and that said Letters Patent is hereby corrected as shown below:

Column 42, line 8, "dialkylazino" should read --diarylamino--.

Signed and Sealed this

First Day of August, 1995

Attest:

BRUCE LEHMAN

Attesting Officer

Commissioner of Patents and Trademarks